US010112361B2

(12) United States Patent
Sumi et al.

(10) Patent No.: US 10,112,361 B2
(45) Date of Patent: Oct. 30, 2018

(54) CORE MATERIAL FOR SANDWICH PANEL, METHOD OF MOLDING CORE MATERIAL FOR SANDWICH PANEL, SANDWICH PANEL, AND METHOD OF MOLDING SANDWICH PANEL

(75) Inventors: Takehiko Sumi, Tokyo (JP); Tadatoshi Tanji, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 452 days.

(21) Appl. No.: 12/736,654

(22) PCT Filed: Apr. 30, 2009

(86) PCT No.: PCT/JP2009/001977
§ 371 (c)(1),
(2), (4) Date: Feb. 22, 2011

(87) PCT Pub. No.: WO2009/136489
PCT Pub. Date: Nov. 12, 2009

(65) Prior Publication Data
US 2011/0135862 A1 Jun. 9, 2011

(30) Foreign Application Priority Data

Apr. 30, 2008 (JP) ................................. 2008-119404
Jun. 25, 2008 (JP) ................................. 2008-166643

(51) Int. Cl.
*B29C 49/20* (2006.01)
*B29C 51/12* (2006.01)
(Continued)

(52) U.S. Cl.
CPC .............. *B32B 3/06* (2013.01); *B29C 43/146* (2013.01); *B29C 47/0019* (2013.01);
(Continued)

(58) Field of Classification Search
CPC .......... B29C 2049/0057; B29C 51/267; B29C 49/0005; B29C 2049/2047;
(Continued)

(56) References Cited

U.S. PATENT DOCUMENTS 3,313,073 A    4/1967  Mathews
3,327,885 A *  6/1967  Carle et al. ................... 220/510
(Continued)

FOREIGN PATENT DOCUMENTS

GB    2211780 A  *  7/1989  ............. B29C 70/46
JP    S55-67444       5/1980
(Continued)

OTHER PUBLICATIONS

Machine translation of Japanese Patent Publication No. JP-2003071912A, originally published Mar. 2003, 6 pages.*

(Continued)

*Primary Examiner* — William P Bell
(74) *Attorney, Agent, or Firm* — Maier & Maier, PLLC

(57) ABSTRACT

An object of the present invention is to provide a core member for a sandwich panel and a method of forming the core member for the sandwich panel which are capable of attaining a desired profile, a desired pattern on its surface, and a desired inner structure in accordance with an application of the sandwich panel.
According to an aspect of the invention, there is provided a thermoplastic resin core member interposed between two resin skin sheets comprising a closed hollow portion located to be inside of a desired position in accordance with an application of the sandwiched panel, and it is formed by clamping parison of a molten thermoplastic resin positioned to be between two split molds so as to exhibit a desired profile and/or a surface shape, two surfaces against each of (Continued)

which the molten parison is pressed to form an adhesive surface on which the corresponding resin skin sheet is formed.

9 Claims, 22 Drawing Sheets

(51) Int. Cl.
| | | |
|---|---|---|
| *B32B 3/06* | (2006.01) | |
| *B29C 43/14* | (2006.01) | |
| *B29C 47/00* | (2006.01) | |
| *B29C 49/00* | (2006.01) | |
| *B29C 51/10* | (2006.01) | |
| *B29C 51/26* | (2006.01) | |
| *B32B 3/04* | (2006.01) | |
| *B32B 3/12* | (2006.01) | |
| *B32B 3/26* | (2006.01) | |
| *B32B 5/18* | (2006.01) | |
| *E04B 2/00* | (2006.01) | |
| *E04C 2/34* | (2006.01) | |
| *E04B 5/02* | (2006.01) | |
| *B29C 43/00* | (2006.01) | |
| *B29C 43/20* | (2006.01) | |
| *B29C 43/02* | (2006.01) | |
| *B29C 43/34* | (2006.01) | |
| *B29C 49/24* | (2006.01) | |
| *B29K 105/06* | (2006.01) | |
| *B29K 705/00* | (2006.01) | |
| *B29L 31/30* | (2006.01) | |
| *B29L 31/60* | (2006.01) | |
| *B29L 31/00* | (2006.01) | |

(52) U.S. Cl.
CPC .......... *B29C 49/0047* (2013.01); *B29C 49/20* (2013.01); *B29C 51/10* (2013.01); *B29C 51/267* (2013.01); *B32B 3/04* (2013.01); *B32B 3/12* (2013.01); *B32B 3/26* (2013.01); *B32B 5/18* (2013.01); *B29C 43/00* (2013.01); *B29C 43/203* (2013.01); *B29C 47/004* (2013.01); *B29C 47/0023* (2013.01); *B29C 47/0038* (2013.01); *B29C 47/0054* (2013.01); *B29C 2043/023* (2013.01); *B29C 2043/148* (2013.01); *B29C 2043/3411* (2013.01); *B29C 2043/3433* (2013.01); *B29C 2049/2008* (2013.01); *B29C 2049/2065* (2013.01); *B29C 2049/2402* (2013.01); *B29C 2791/006* (2013.01); *B29C 2791/007* (2013.01); *B29K 2105/06* (2013.01); *B29K 2705/00* (2013.01); *B29L 2031/3041* (2013.01); *B29L 2031/608* (2013.01); *B29L 2031/772* (2013.01); *E04C 2/34* (2013.01); *E04C 2/46* (2013.01); *E04C 2/50* (2013.01); *Y10T 428/1393* (2015.01); *Y10T 428/233* (2015.01); *Y10T 428/24322* (2015.01); *Y10T 428/24488* (2015.01); *Y10T 428/24562* (2015.01); *Y10T 428/24612* (2015.01); *Y10T 428/24661* (2015.01); *Y10T 428/24777* (2015.01)

(58) Field of Classification Search
CPC ........ B29C 2049/2065; B29D 99/0021; B32B 3/28; B32B 3/30; B32B 5/32; E04C 2/3405; E04C 2002/3411–2002/3494; F16B 7/0413–7/042; F16B 7/0426; F16L 21/007
USPC .. 156/244.13, 244.14, 244.15, 156, 244, 12, 156/13, 15; 264/516, 545; 265/279.1; 428/178
See application file for complete search history.

(56) References Cited

U.S. PATENT DOCUMENTS

| | | | | |
|---|---|---|---|---|
| 3,462,330 | A | * | 8/1969 | Greig et al. ............... 156/210 |
| 4,201,609 | A | | 5/1980 | Olsen |
| 4,285,610 | A | * | 8/1981 | Rusch .................... A47B 96/06 403/189 |
| 5,056,577 | A | | 10/1991 | DeLong et al. |
| 5,129,628 | A | | 7/1992 | Vesper |
| 5,182,158 | A | * | 1/1993 | Schaeffer ................. B32B 3/12 428/116 |
| 5,266,379 | A | * | 11/1993 | Schaeffer et al. ............. 428/178 |
| 5,966,885 | A | | 10/1999 | Chatelain |
| 6,209,273 | B1 | * | 4/2001 | Jeffers ................... E04B 2/7448 52/220.7 |
| 6,269,608 | B1 | | 8/2001 | Porter |
| 6,440,353 | B1 | * | 8/2002 | Hutchins ...................... 264/545 |
| 2001/0009703 | A1 | * | 7/2001 | Toshikawa .................. 428/35.7 |
| 2005/0126852 | A1 | * | 6/2005 | Nakajima et al. ............ 181/293 |
| 2007/0204553 | A1 | | 9/2007 | Bunker, II |
| 2008/0254261 | A1 | | 10/2008 | Tamada |

FOREIGN PATENT DOCUMENTS

| | | | |
|---|---|---|---|
| JP | 06-179236 | | 6/1994 |
| JP | 07-171877 | | 7/1995 |
| JP | 08-118462 | | 5/1996 |
| JP | H11-216789 | A | 8/1999 |
| JP | 2001171042 | A | 6/2001 |
| JP | 2002-096379 | | 4/2002 |
| JP | 2003071912 | A * | 3/2003 |
| JP | 2004-249607 | | 9/2004 |
| JP | 2005-132016 | | 5/2005 |
| JP | 2006-103027 | | 4/2006 |
| JP | 2008-247003 | | 10/2008 |
| WO | WO 2006106933 | A1 | 10/2006 |

OTHER PUBLICATIONS

Non-Final Office Action dated Sep. 26, 2016, issued in U.S. Appl. No. 14/457,964 (14 pages).
Office Action dated Oct. 6, 2017 from corresponding divisional U.S. Appl. No. 14/457,964; 15pgs.

* cited by examiner (A-1,B-1)

(A-2,B-2)

(A-3,B-3)

(A-4,B-4)

(A-5,B-5)

(A-6,B-6)

CORE MATERIAL FOR SANDWICH PANEL, METHOD OF MOLDING CORE MATERIAL FOR SANDWICH PANEL, SANDWICH PANEL, AND METHOD OF MOLDING SANDWICH PANEL

This is a national stage of PCT/JP09/001977 filed Apr. 30, 2009 and published in Japanese, which has a priority of Japanese no. 2008-119404 filed Apr. 30, 2008, and Japanese no. 2008-166643 filed Jun. 25, 2008, hereby incorporated by reference.

TECHNICAL FIELD

The present invention relates to a core member for a sandwich panel, a method of forming said core member for the sandwich panel, said sandwich panel and a method of forming said sandwich panel, in particular, it relates to the core member for the sandwich panel, the method of forming said core member for the sandwich panel which are capable of attaining a profile, a surface shape and an inner structure in a desired manner in accordance with an application of said sandwich panel, relating to the sandwich panel which is capable of reducing its weight and yet securing its strength due to the fact that the core member of which includes a hollow portion and yet secures its strength, while skin sheets of which include a strength higher than that of the core member and secure good adhesion properties between the core member and the skin sheet, and relates to the method of forming said sandwich panel which is capable of securing a sufficient strength and yet attaining any profile or any surface shape in a desired manner without a need to reheat an element such as said skin sheet, said core member, etc.

BACKGROUND TECHNOLOGY

Conventionally, so-called sandwich panels have been used in vehicles such as automobiles, airplanes, etc., building material, casings for electric appliances, and equipment for sports and leisure.

The sandwich panel comprises two skin sheets and a core member interposed between the two skin sheets, and has a basic structure in which one skin sheet, the core member and the other skin sheet are laminated. However, a function required for such a sandwich panel varies in accordance with its application.

For instance, in case a case where an esthetic appearance is thought much of, while a high strength is not required, like an inner panel used in a bath room, a decorative sheet a surface property or an entire forming shape of which is thought much of is additionally attached to the skin sheet at the outer side and, while, in the case of an application as a structural member, strength takes priority over the esthetic appearance.

In this respect, since, in case of inner panels of vehicles such as automobiles, airplanes, a cargo floor board, a deck board, a rear parcel shelf, etc. in particular, in view of reducing the cost of fuel, since a light weight as well as a high strength are required, sandwich panels the skin sheets and the core member of which are made of resin have been adopted.

Conventionally, in such a sandwich panel, in order to attain a profile required in accordance with its application, the two skin sheets and the core member have been respectively manufactured by a cutting operation, and the manufactured two skin sheets and the core member have been assembled together and adhered to each other to complete the sandwich panel.

On the other hand, the resin sandwich panel the skin sheets and the core member of which are made of resin have been manufactured by various forming processes. Patent Publication 1 discloses a method of forming a resin sandwich panel in an extrusion forming manner.

In this forming process, the sandwich panel exhibiting good adhesion properties between the adjacent layers can be continuously manufactured by extruding each of the layers constituting the sandwich panel from a T-die and welding each of the layers in a molten state utilizing fusion heat.

Patent Publication 2 discloses a method of forming a resin sandwich panel in an injection forming manner.

In this forming process, in a sandwich panel in which a skin layer is made of a composition different from that of an inner layer, the composition for the skin layer is injected from a first cylinder up to an amount necessary for forming a thickness of the skin layer, and then, the composition for the inner layer is injected from a second cylinder at a high speed to form the sandwich panel in which the skin layer has a thin thickness.

According to the method of forming the resin sandwich panel by such an injection molding, it is feasible to form not only a molded product with a constant cross section, but also that with any profile whose cross section varies, so that there is little limitation to the shape of the molded product, as compared with the extrusion molding.

However, since, in injection molding, resin in a molten state is injected into a sealed mold space to be pressed against an inner surface of the sealed mold to be formed, it is technically difficult to form a molded product including a sealed hollow portion inside only by injection molding.

For instance, in a case where the resin sandwich panel is utilized as a cargo floor lid for an automobile, its profile has to be a complicated shape including curves with various curvatures, while, in a case where the resin sandwich panel is utilized as a structural member, an inner structure with its stiffness sufficient to withstand a local external load is required.

In this respect, as a first aspect, it is desired to realize a core member for a sandwich panel and a method of forming said core member for the sandwich panel which are capable of attaining a desired profile, a desired surface shape, and a desired inner structure in accordance with an application of the sandwich panel.

In a case where the resin sandwich panel is utilized as a cargo floor lid for an automobile, not only a good external esthetic appearance, but also a high stiffness (a high flexural rigidity, in particular) to withstand the weight of luggage are required, since the cargo floor lid is used in such a way that heavy luggage is rested thereon, while on the other hand, a light weight thereof is required so as to reduce the fuel cost. Such being the case, it is crucial to solve a difficult technical problem, that is, compatibility of high stiffness with light weight. For this reason, as the resin sandwich panel for such an application, a rigid resin with a high Young's modulus has been adopted for the skin sheet, while, in the core member, a thickness of the core member has been increased to enhance the section modulus by enlarging the distance between the two skin sheets, while, foamed material has been adopted for the core member itself, or a hollow portion has been provided inside thereof, or a plurality of recesses have been provided on its surface in order to reduce the weight of the sandwich panel.

Recently, much attention has been paid to a resin core member with a so-called honeycomb structure for the resin sandwich panel with a high stiffness and a light weight.

The resin core member with such a honeycomb structure is roughly divided into two types, one being that in which a plurality of recesses each opening of which on the one surface of the core member is shaped to be a regular hexagon are provided on one surface so as to protrude at a side of the other surface, the other being that in which a plurality of perforated holes each opening of which is shaped to be a regular hexagon are provided on the surface of the core member.

According to such a resin core member with the honeycomb structure, the void volume can be secured to reduce its weight, since it is possible to densely arrange the plurality of recesses or perforated holes on the surface of the core member in the most efficient manner.

Patent document 3 discloses a sandwich panel including a resin core member with a number of truncated conical recesses formed by an extruding forming process using a stepped roll.

This sandwich panel comprises two skin sheets made of resin and a core member made of thermoplastic resin interposed between two skin sheets, and the core member comprises a pair of plates made of thermoplastic resin on an outer surface of each of which a plurality of truncated conical recesses each of which inwardly tapers in a converging manner are provided. Each of the plurality of truncated conical recesses is formed by a plurality of protrusions provided on the surface of the stepped roll and protrudes at an inner surface side to form an abutting planar portion at its most convergent portion. The core member is formed by abutting the butting planar portion of each of the recesses of one of the pair of plates against that of the corresponding recess of the other of the pair of plates through a clamping force caused by the stepped roll.

According to the above sandwich panel, its weight can be decreased by heightening a void volume by means of the plurality of recesses.

However, a sufficient flexural rigidity as an entire sandwich panel cannot be attained, since adhesion properties between the pair of plates constituting the core member are poor.

More specifically, a pair of resin plates are caused to pass between rollers including the stepped roller to be adhered to each other by a pressing force being applied thereto, so that sufficient adhesion properties are not obtained due to the facts that the adhesion between the pair of resin plates is not a surface-to-surface adhesion, but close to a point-to-point adhesion, and that the time period for adhering the pair of plates is short.

In this respect, according to the forming process using mold(s), although each of the plurality of recesses have to possess an inwardly converging taper angle in view of a limitation that the forming is carried out using the mold(s), such a technical problem is not caused, because a sufficient adhering time period can be obtained while the molds are clamped.

Patent document 4 discloses a method of manufacturing a resin sandwich panel by sheet forming (compression molding), which is one of the forming processes using molds.

More specifically, the skin sheet and the core member (and the decoration member as the occasion demands) are disposed between the pair of split molds, and then, the split molds are closed, whereby the skin sheet and the core member within the closed molds are pressurized to be formed, while the skin sheet and the core member are welded. In this respect, it is possible to form the sandwich panel at one time.

However, in order to form or weld by closing or clamping the molds, each of the skin sheet and the core member has to be in a molten state, so that, in a case where the skin sheet is fed from a raw material sheet roll as a continuous sheet, for instance, it is necessary to heat it again with an infrared heater, etc. before it is positioned between the pair of split molds. The following technical problems can be caused due to such a reheating.

Firstly, in the sandwich panel formed by the sheet forming process, it is difficult to attain a complicated outer shape and a complicated pattern on its surface. More specifically, it is difficult to bring the inside of the sheet into a sufficient molten state by such a reheating which heats the sheet from its outer surface. If the time period for heating the sheet is lengthened in order to make the inside of the sheet a sufficiently molten state, the sheet is caused to sag under its own weight, which makes the forming process itself difficult. Even if the sheet is formed, it is not technically feasible to attain a complicated outer shape or an embossed pattern, etc. on its surface, since characteristics in which the sheet is formed along the cavity of the mold becomes worse.

Secondly, in the sandwich panel formed by the sheet forming process, it is difficult to obtain a sandwich panel with sufficient strength in a case where it is used as a structural member. More specifically, since the welding strength of an outer peripheral parting line PL which is a welded portion between the skin sheets, or the welding strength of a welded portion between the skin sheet and the core member becomes worse due to a bad influence of the above-described reheating on the molding properties, the strength of the entire sandwich panel becomes deteriorated.

In view of these, as a second aspect, it is desired to realize a method of producing the sandwich panel which is capable of producing the sandwich panel with any outer shape or any pattern on its surface exhibiting a sufficient strength without a need to reheat the elements such as the skin sheets, the core members, etc.

In this connection, according to a blow molding or a vacuum forming process which is one of the forming processes using mold(s), it is feasible to form a molten resin as it is, so that efficient forming can be realized by omitting the process in which the molded product as a molding is reheated to be formed as a post-forming.

However, if the sandwich panel is formed by blow molding or vacuum forming, a peculiar technical problem associated with the blow-up ratio is caused.

More specifically, as to the flexural rigidity of the entire sandwich panel, on the condition that the adhesion properties between the core member and each of the pair of the skin sheets is secured, the larger the thickness of the core member becomes, the more the flexural rigidity of the entire sandwich panel can be improved due to the increase of the section modulus of the pair of the skin sheets.

However, on the other hand, the larger the thickness of the core member becomes, the bigger the blow-up ratio becomes, so that a phenomenon in which a peripheral edge portion of an opening of each of the plurality of recesses on the core member becomes dull, whereby the flatness is so reduced that the adhesion area on the surface of the core member is substantially lost, and as a result, it becomes difficult to secure sufficient adhesion properties between the core member and the skin sheets. On the other hand, in a case where the tapering angle of each of the plurality of recesses is constant, the larger the thickness of the core member becomes, the bigger the aperture rate on the surface of the core member by the plurality of recesses becomes, whereby the adhesion area is lost, while the void volume caused by the plurality of recesses is increased to decrease the weight of the sandwich panel.

Such being the case, in a case where the sandwich panel is formed by blow molding or vacuum forming, the balance between the thickness of the core member and the tapering angle of each of the recesses is important in order to decrease the weight of the sandwich panel, while at the same time to attain high stiffness.

On the other hand, in a case where a bending load is applied to the sandwich panel, the maximum bending stress is generated on the lower and upper skin sheets. Even if the thickness of the core member is secured and sufficient adhesion properties between the core member and the skin sheet are maintained, the core member itself can be destroyed or fractured. In this respect, it is also necessary to secure a structural integrity of the core member itself.

In this respect, as a third aspect, it is desired to realize a sandwich panel with a light weight and a high stiffness by having the core member include a hollow portion and yet secure the strength, while at the same time by having the skin sheets possess the strength higher than that of the core member, and secure the sufficient adhesion properties between the core member and the skin sheets.

In this connection, patent publication 5 discloses a structural plate made of synthetic resin produced by blow molding. More specifically, the structural plate consists of a plate body made of thermoplastic resin produced by blow molding on a face side and an underside of which a plurality of recesses are formed, respectively, in such a way that the bottom portion of each of the plurality of recesses on the face side and the corresponding bottom portion of each of the plurality of recesses on the underside are disposed back to back to be opposite to each other.

According to such a structural plate, the weight can be decreased while at the same time its compressive and tensile strength can be improved.

However, patent publication 5 only discloses a structural plate made of synthetic resin, and does not discloses a sandwich panel constituted by a core member like this structural plate and the skin sheets fixed on the face side and the underside of the core member, respectively, much less the flexural rigidity as a sandwich panel based on the stiff adhesion properties between the skin sheet and the core member.

Patent publication 1: Japanese Patent Laid-open Publication SH055-67444
Patent publication 2: Japanese Patent Laid-open Publication 2005-132016
Patent publication 3: Japanese Patent Laid-open Publication 2006-103027
Patent publication 4: Japanese Patent Laid-open Publication HEI07-171877
Patent publication 5: Japanese Patent Laid-open Publication 2008-247003

DISCLOSURE OF INVENTION

Problems to be Solved

Figure 1:
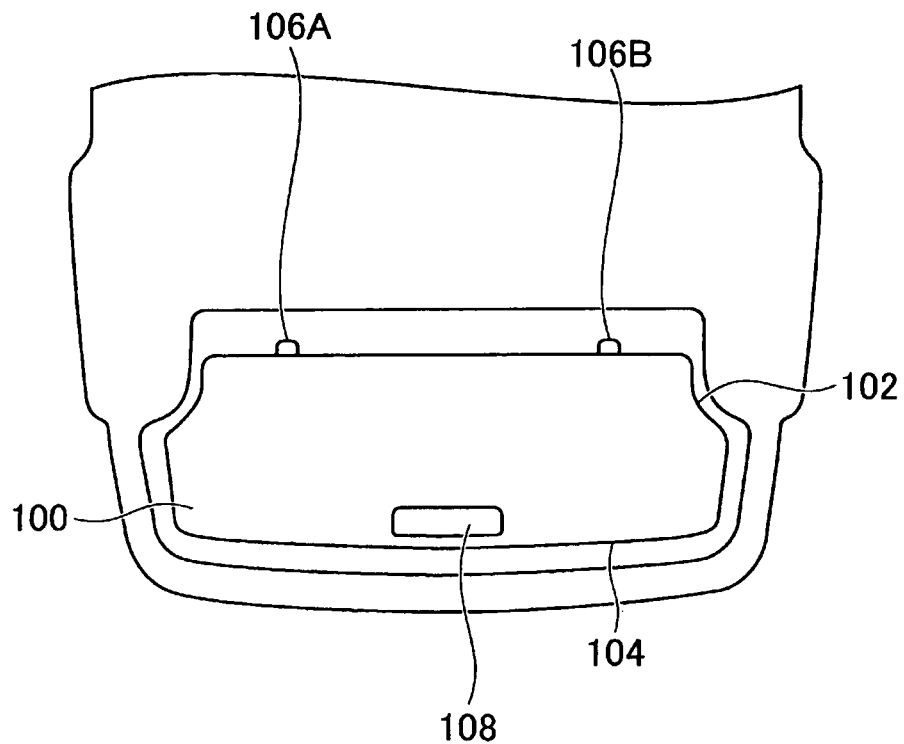
FIG. 1 is a view showing a situation in which the sandwich panel according to the first embodiment of the present invention is applied to an automobile.

In view of the above technical problems, an object of the present invention is to provide a core member for a sandwich panel and a method of forming the core member for the sandwich panel which are capable of attaining a desired profile, a desired pattern on its surface, and a desired inner structure in accordance with an application of the sandwich panel.

In view of the above technical problems, another object of the present invention is to provide a method of forming a sandwich panel which is capable of realizing the sandwich panel with a sufficient strength, any profile or pattern without a need to reheat elements of the sandwich such as skin sheets, the core member, etc.

In view of the above technical problems, still another object of the present invention is to provide a sandwich panel which is capable of realizing the sandwich panel with a light weight and yet a high stiffness by having a core member include a hollow portion and yet secure its strength, while having a skin sheet include a stiffness higher than that of the core member and secure sufficient adhesion properties between the core member and the skin sheet.

Means to Solve Technical Problems

In view of the above technical problems, according to an aspect of the invention, there is provided a thermoplastic resin core member for a sandwich panel interposed between two resin skin sheets comprising a closed hollow portion located to be inside thereof at a desired position in accordance with an application of the sandwiched panel, and it is formed by clamping a parison of a molten thermoplastic resin positioned to be between two split molds so as to exhibit a desired profile and/or a surface shape, each of two surfaces of the molten parison which is pressed against a cavity of the corresponding split mold forms an adhesive surface to which the corresponding resin skin sheet is adhered.

According to the core member made of a thermo plastic resin for a sandwich panel including the above construction, a parison in a molten state positioned between two split molds can be formed into a core member made of a thermo plastic resin for a sandwich panel by closing two split molds in such a way that a sealed hollow space is provided inside of the core member at a desired position while at the same time the core member is shaped to be a desired profile in accordance with an application of the sandwich panel, while a surface of the core member which is pressed against the cavity of the corresponding split mold can be joined to the corresponding resin skin sheet, whereby the core member for a sandwich panel which is capable of realizing a desired profile, a desired surface shape, and an inner structure in accordance with the application of the sandwich panel can be provided. In particular, a parting line can be formed so as to contribute to the improvement of the stiffness of the entire sandwich panel by welding peripheral edges of the opposed resin skin sheets between which the core member is interposed.

In another embodiment of the present invention, said parison made of a thermo plastic may be in a tube, a tubular, or a sheet form.

In another embodiment of the present invention, said thermoplastic resin core member may comprise a plurality of recesses on a surface which is pressed against the cavity each of which recesses includes a predetermined tapered angle so as to be inwardly converged, said predetermined tapered angle of each of said plurality of recesses is determined in accordance with a flexural rigidity required for the sandwiched panel, based on a relationship between a thickness of the core member and a total adhesive area between said surface and the corresponding skin sheet.

In another embodiment of the present invention, said thermoplastic resin core member may be formed by closing said two spilt molds so as to form two sheet-like parisons in molten states positioned between the two split molds, said thermoplastic resin core member comprises a pair of plates each of which is made of thermoplastic resin and formed based on the corresponding sheet-like parison in a molten state, each of said pair of plates includes a plurality of recesses on its outer surface inwardly converging so as to protrude at a side of its inner surface, each of said plurality of recesses includes a planar portion at the most convergent portion, and the core member is formed by abutting and welding the planar portion of each of the plurality of recesses of one of the pair of the thermo plastic plates and that of the corresponding recess of the other of the pair of the thermo plastic plates in a back to back manner.

In another embodiment of the present invention, either of said plurality of recesses may form a groove or a perforated hole into which a reinforcing member is embedded.

In another embodiment of the present invention, said thermoplastic resin core member for a sandwich panel may be of a divided type in which divided parts are connected by reinforcing members, each of said reinforcing members includes a concave portion into which an end portion of the divided core member fits, while said end portion includes a convex portion whose shape is complementary to said concave portion.

In view of the above technical problems, according to another aspect of the invention, there is provided a sandwich panel comprising two resin skin sheets and a thermoplastic resin core member interposed therebetween, said thermoplastic resin core member is formed by using a mold and consists of a pair of thermoplastic resin plates, each of the pair of thermoplastic resin plates includes a plurality of recesses inwardly converging so as to protrude at the side of the inner surface, each of the plurality of recesses includes a portion at its most convergent portion abutting against, the core member is formed by abutting against, each of the pair of thermoplastic resin plates is at its surface adhered to the corresponding sheet, the angle at which the plurality of recesses tapers are determined based on an interrelationship among a thickness of the core member, a total adhering area at which the skin sheets adheres to the surface of the corresponding resin plates, and a total area at which the pair of resin plates abut against.

According to the sandwich panel including the above construction, the flexural rigidity of the entire sandwich panel can be secured, while at the same time the weight of the sandwich panel can be decreased by providing a plurality of recesses on the surface of each of the pair of thermo plastic plates and enlarging a distance between the two skin sheets by abutting the pair of thermo plastic plates against each other to secure a thickness as a core member.

In this case, as the thickness of the core member increases, the flexural rigidity can be improved by the two skin sheets, while, as a tapering angle of each of the plurality of recesses relative to a horizontal line recesses decreases, the flexural rigidity can be decreased.

Since as the tapering angle decreases, an opening of each of the plurality of recesses on the surface of each of the pair of thermo plastic plates is enlarged, while an area of the abutting planar portions of the recesses is decreased, if the thickness is constant, an adhesive area between each of the pair of the thermo plastic plates and the corresponding skin sheet, and an area at which the pair of the thermo plastic plates are abutted against each other are decreased, whereby the contribution of the improvement of the flexural rigidity of the sandwich panel due to the adhesive fixation between the pair of the thermo plastic plates and the two skin sheets is decreased.

Such being the case, the desired flexural rigidity of the sandwich panel can be obtained while at the same time the decrease of its weight can be attained in accordance with an application of the sandwich panel by determining the tapering angle of each of the plurality of recesses based on a relationship among the distance between the two skin sheets, a total adhesive area between each of the two skin sheets and the corresponding thermo plastic plate and a total abutting area at which the pair of thermo plastic plates are abutted against each other in view of obtaining the flexural rigidity required for the sandwich panel.

In another embodiment of the present invention, each of said plurality of recesses may include a bottom, said abutting portion includes a planar abutting portion, and said core member is formed by welding the planar abutting portion of each of said plurality of recesses of one of said pair of resin plates to that of the corresponding recess of the other of said pair of resin plates in a back to back configuration.

In another embodiment of the present invention, said abutting portion may be formed by a peripheral portion of an opening formed on each of the surfaces opposed to each other of the pair of resin plates, said core member including perforated holes is formed by welding the abutting portion of each of said plurality of recesses of one of said pair of resin plates to that of the corresponding recess of the other of said pair of resin plates in a back to back configuration.

In another embodiment of the present invention, each of said plurality of recesses may be shaped to be a truncated pyramid which includes a regular hexagon opening on an outer surface of said thermoplastic core member.

In another embodiment of the present invention, said plurality of recesses may be disposed to be in a honeycomb pattern on said outer surface of the thermo plastic core member.

In view of the above technical problems, according to another aspect of the invention, there is provided a sandwich panel comprising two resin skin sheets and a thermo plastic core member interposed therebetween, said thermo plastic core member consists of a pair of thermo plastic plates, and each of the pair of thermo plastic plates includes at its outer surface a plurality of recesses inwardly converging so as to protrude at a side of its inner surface, each of the plurality of recesses includes at its most convergent abutting planar portion, and the core member is formed by abutting and welding the planar portion of each of the plurality of recesses of one of the pair of the thermo plastic plates and that of the corresponding recess of the other of the pair of the thermo plastic plates in a back to back manner by means of blow molding or vacuum molding, each of the thermoplastic resin plates is adhered at its surface to the corresponding skin sheet, a relationship between a thickness of said core member and an angle at which each of the plurality of recesses tapers are determined in accordance with a flexural rigidity required for the sandwich panel so as to secure an adhesive area between the skin sheets and the core member.

According to the sandwich panel including the above construction, the flexural rigidity of the entire sandwich panel can be secured, while at the same time the weight of the sandwich panel can be decreased by providing a plurality of recesses on the surface of each of the pair of thermo plastic plates and enlarging a distance between the two skin sheets by abutting the pair of thermo plastic plates against each other to secure a thickness as a core member.

In this case, as the thickness of the core member increases, the blow-up ratio is increased, so that sagging is generated around an opening of each of said plurality of recesses provided on the surface of each of the pair of the thermo plastic plates, whereby the flatness of the surface is deteriorated to make it difficult to secure the adhesiveness between each of the pair of thermo plastic plates and the corresponding skin sheet.

On the other hand, as the tapering angle of each of the plurality of recesses relative to the horizontal line increases, the opening of each recess is enlarged, while the area at which the opposed recesses are abutted against each other is decreased if the thickness of the core member is constant.

Accordingly, a bad influence on the adhesiveness due to the blow-up ratio can be restricted, while at the same time an area of the abutting planar portions of the plurality of recesses constituting adhesive portions of the pair of thermo plastic plates can be secured by determining a relationship between the thickness of the core member and each of the plurality of recesses so as to secure the adhesiveness between each of the skin sheet and the core member in accordance with the flexural rigidity required for the sandwich panel.

On the other hand, the strength of the core member can be secured while the core member includes a hollow portion by securing a void volume based on the opening area of said plurality of recesses provided on the surface of each of the pair of the thermo plastic resin plates, while the core member with a light weight and a high stiffness can be provided by making the stiffness of each of the skin sheets higher than that of the core member while at the same time securing the sufficient adhesiveness between the core member and each of the skin sheets.

In another embodiment of the present invention, each of said plurality of recesses may be shaped to be a truncated pyramid which includes a regular hexagon opening on said outer surface of said thermo plastic core member.

In another embodiment of the present invention, said plurality of recesses may be disposed to be in a honeycomb pattern on said outer surface of said thermo plastic core member.

In view of the above technical problems, according to another aspect of the invention, there is provided a method of forming a core member made of a thermo plastic for a sandwich panel which includes a thermo plastic core member interposed between two resin skin sheets comprising steps of;

positioning a molten parison made of thermal plastic between a pair of split molds in such a way that said parison protrude around cavities of said pair of split molds, closing said pair of split molds to form a sealed space inside said pair of split molds, and forming said parison in said sealed space by means of irregularities provided on said cavity of each of said pair of split molds by pressurizing inside said molten parison in said sealed space, or sucking said molten parison in a molten state through said pair of closed split molds, whereby a profile and a surface shape of said parison in said sealed space is formed.

According to the method of forming the thermo plastic core member including the above construction, a sealed space is formed inside the pair of split molds by positioning a parison in a molten state made of a thermo plastic between the two split molds so as to protrude around the cavities of the split molds, and closing the two split molds. The core member for a sandwich panel with a desired profile, a desired surface shape and a desired inner structure can be provided in accordance with an application of the sandwich panel based on the irregular portions provided on the cavity of each of the split molds by pressurizing the parison in the sealed space (blow molding), or by sucking the parison in the sealed space through the closed pair of split molds (vacuum forming).

In view of the above technical problems, according to another aspect of the invention, there is provided a method of forming a core member made of a thermo plastic for a sandwich panel which includes a thermo plastic core member interposed between two resin skin sheets comprising steps of;

positioning two sheet-like parisons made of thermal plastic between a pair of split molds in such a way that said parisons protrude around cavities of said pair of split molds, forming a sealed space between said cavity of each of the pair of split molds and said corresponding sheet-like parison by bringing said corresponding sheet-like parison into abutment with a pair of protrusions which are disposed to be spaced apart from each other on said cavity and protrude from said cavity toward the other cavity, forming said sheet-like parisons by sucking said sheet-like parisons through said sealed space to press said sheet-like parisons against the cavities of said pair of split molds, and closing said pair of split molds to weld said two sheet-like parisons, whereby a sealed hollow portion is formed inside the sheet-like parisons, while at the same time a plurality of recesses or a plurality of perforated holes are provided on surfaces of said sheet-like parisons by a parting line being formed around peripheral edges of said welded two sheet-like parisons.

In another embodiment of the present invention, said forming step may comprise a step of forming a plurality of recesses corresponding to a plurality of protrusions which are provided on the cavity of at least one of the pair of split molds and each of which tapers so as to converge toward the opposed split mold, on the surface of the corresponding sheet-like parison by pressing it against said plurality of protrusions.

In view of the above technical problems, according to another aspect of the invention, there is provided a method of forming a sandwich panel including a core member made of a thermo plastic interposed between two resin skin sheets comprising the steps of;

positioning said core member made of a thermo plastic formed by the above-described method of forming the core member made of a thermo plastic between said pair of split molds, positioning said two sheet-like parisons made of thermo plastic in molten states between said pair of split molds so as to protrude around the cavities of said pair of split molds and sandwich the core member, closing said pair of split molds to form a sealed space inside said pair of split molds, and forming said sheet-like parisons in said sealed space by means of irregularities provided on the cavity of each of said split molds by pressurizing inside said sealed space or sucking said sealed space through said pair of closed split molds to weld said sheet-like parisons and said core member, whereby a parting line is formed around peripheral edges of said welded sheet-like parisons with said core member being arranged inside.

According to the method of forming the sandwich panel including the above construction, skin sheets sandwiching the core member can be formed on the spot by utilizing the thermo plastic sheet-like parison in a molten state, while its characteristics in which it is formed along the cavity of the mold can be prevented from being deteriorated due to the reheating of the skin sheet from outside, while at the same time, the adhesive strength of the outer peripheral parting line constituting a welding portion of the skin sheets, or the adhesive strength between the skin sheet and the core member can be prevented from being deteriorated without causing the waving or the deformation of the skin sheet due to the difference of the thermal shrinkage originated from the difference of the cooling speed between the core member and the skin sheet by utilizing the core member already having been formed, since the thermal capacity of the skin sheet with a comparatively thin thickness is low, and thus the skin sheet is readily cooled. Such being the case, the sandwich panel with a sufficient strength and any profile or surface shape can be provided without a need to reheat the skin sheet.

In view of the above technical problems, according to another aspect of the invention, there is provided a method of forming a sandwich panel including a core member made of a thermo plastic interposed between two resin skin sheets comprising the steps of:

positioning said core member made of a thermo plastic formed by the method of forming the core member made of a thermo plastic between said pair of split molds, positioning said two sheet-like parisons made of thermo plastic in molten states between said pair of split molds so as to protrude around the cavities of said pair of split molds and sandwich the core member, forming a sealed space between said cavity of each of the pair of split molds and said corresponding sheet-like parison by bringing said corresponding sheet-like parison into abutment with a pair of protrusions which are disposed to be spaced apart from each other on said cavity and protrude from said cavity toward the other cavity, forming each of said sheet-like parisons by sucking it through said corresponding sealed space so as to press it against said corresponding cavity of said pair of split molds, and closing said pair of split molds to weld said two sheet-like parisons and said core member, whereby a parting line is formed around peripheral edges of said welded sheet-like parisons with said core member being arranged inside.

In view of the above technical problems, according to another aspect of the invention, there is provided a method of forming a sandwich panel including a core member made of a thermo plastic interposed between two resin skin sheets comprising the steps of:

vertically inserting a decoration sheet between a pair of split molds a cavity of each of which is disposed to be vertical, holding said decoration sheet by one of said pair of split molds, vertically feeding each of two continuous sheet-like parisons made of thermo plastic in a molten state from an extrusion die disposed to be vertically above said pair of split molds to position it between a pair of frame members disposed to be vertically between said pair of split molds in a telescoped manner, temporarily fixing each of said two continuous sheet-like parisons on the corresponding pair of frame members, moving each of said pair of frame members on which said corresponding continuous sheet-like parison made of a thermo plastic in a molten state is temporarily fixed toward the corresponding split mold until said corresponding molten continuous sheet-like parison comes into abutment with the pinch off portion of the corresponding split mold through an opening of said frame member, forming each of the two continuous sheet-like parisons by sucking it through a sealed space defined by the cavity of the corresponding split mold, said pinch off portion and said corresponding molten continuous sheet-like parison in a molten state, inserting said core member between said two formed continuous sheet-like parisons in a molten state, holding said core member to position it by pressing said core member toward one of said pair of split molds against said corresponding continuous sheet-like parison in a molten state, and closing said pair of split molds to weld said two continuous sheet-like parisons in a molten state to said core member.

In another embodiment of the present invention, said step of holding said core member position may double as a step of welding it to the corresponding continuous sheet-like parison.

In another embodiment of the present invention, a size of said core member, or a size of said skin sheet may be determined in such a way that said parting line formed around peripheral edges of said two welded skin sheets is separated from the peripheral edge of said core member.

Effect of the Invention

According to the core member made of a thermo plastic resin for a sandwich panel of the present invention, a parison in a molten state positioned between two split molds can be formed into a core member made of a thermo plastic resin for a sandwich panel which is capable of realizing a desired profile, a desired surface shape, and an inner structure in accordance with the application of the sandwich panel by closing the two split molds.

According to the method of forming the thermo plastic core member of the present invention, a sealed space is formed inside the pair of split molds by positioning a parison in a molten state made of a thermo plastic between the two split molds and closing the two split molds, whereby the core member for a sandwich panel with a desired profile, a desired surface shape and a desired inner structure can be provided in accordance with an application of the sandwich panel based on the irregular portions provided on the cavity of each of the split molds by pressurizing the parison in the sealed space (blow molding), or by sucking the parison in the sealed space through the closed pair of split molds (vacuum forming).

According to the sandwich panel of the present invention, the desired flexural rigidity of the sandwich panel can be obtained while at the same time the decrease of its weight can be attained in accordance with an application of the sandwich panel by determining the tapering angle of each of the plurality of recesses based on a relationship among the distance between the two skin sheets, a total adhesive area between each of the two skin sheets and the corresponding thermo plastic plate and a total abutting area at which the pair of thermo plastic plates are abutted against each other, in view of obtaining the flexural rigidity required for the sandwich panel.

According to the method of forming the sandwich panel of the present invention, skin sheets sandwiching the core member can be formed on the spot by utilizing the thermo plastic sheet-like parison in a molten state, while its characteristics in which it is formed along the cavity of the mold can be prevented from being deteriorated due to the reheating of the skin sheet from outside, while at the same time, the adhesive strength of the outer peripheral parting line constituting a welding portion of the skin sheets, or the adhesive strength between the skin sheet and the core member can be prevented from being deteriorated, whereby the sandwich panel with a sufficient strength and any profile or surface shape can be provided without a need to reheat the skin sheet.

Preferred Embodiments of the Invention

Embodiments of the core member made of a thermoplastic resin for a sandwich panel, the method of forming such a core member, the sandwich panel including such a core member, and the method of forming the sandwich panel according to the present invention will be explained in detail with reference to the drawings. The following embodiments are based on a case where the sandwich panel is used for a cargo floor lid for an automobile which requires a light weight and a high stiffness.

As shown in FIG. 1, the cargo floor lid 100 for the automobile requires a complicated profile because it has to be accommodated in a limited rear space. More specifically, a curved portion 102 with a small curvature for avoiding a tire house, a curved portion 104 with a large curvature along a rear shape of the automobile, and a local protrusion portion 106 constituting a hinge portion for closing and opening the cargo floor lid are necessary. In addition, a concave portion 108 on its surface constitutes a gripping portion a driver grips to close and open the cargo floor lid. Further, light weight is required for the cargo floor lid in order to reduce the cost of fuel, while high stiffness (a high flexural rigidity, in particular) is required because heavy articles such as luggage are rested on its upper surface.

Figure 2:
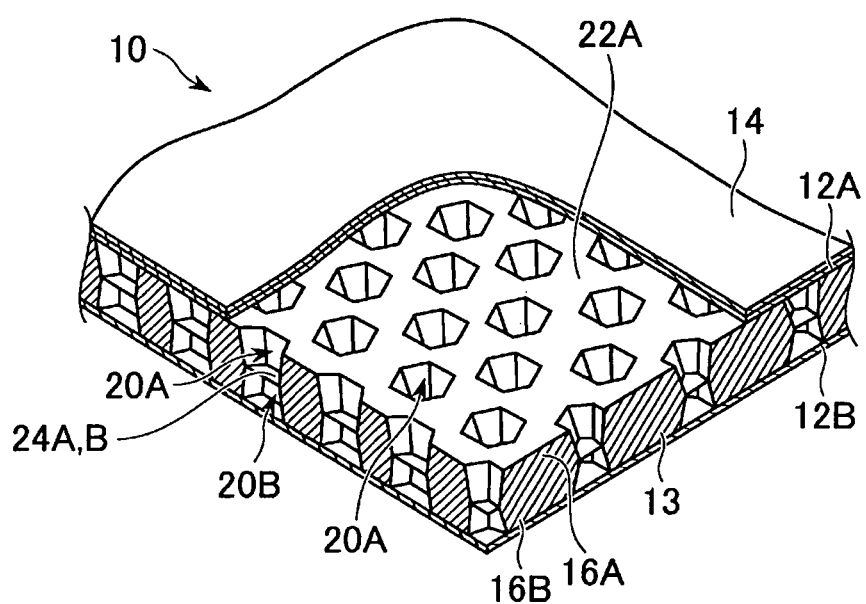
FIG. 2 is a perspective view showing a part of the sandwich panel according to the first embodiment of the present invention in a broken manner.

As shown in FIG. 2, the sandwich panel 10 comprises a face side skin sheet 12A, an underside skin sheet 12B, a core member 13 interposed therebetween, and a decoration sheet 14 which is attached on an outer surface of the face side skin sheet 12A. The sandwich panel 10 is a laminated structure of the decoration sheet 14, the face side skin sheet 12A, the core member 13, and the underside skin sheet 12B.

The core member 13 comprises a pair of thermoplastic resin plates 16A, 16B each of which includes a plurality of recesses 20A, 20B on an outer surface 22 each of which inwardly tapers in a converging manner so as to protrude at a side of an inner surface 18. Each of the plurality of recesses 20A, 20B includes a bottom and an abutting planar portion 24 at the most converged point. The core member 13 is formed by welding the butting planar portion 24 of each of the plurality of recesses 20A, 20B in one of the pair of thermoplastic resin plates 16A, 16B to the corresponding butting planar portion 24 of each of the plurality of recesses 20A, 20B in the other of the pair of thermoplastic resin plates 16A, 16B in back to back manner. Each of the pair of thermoplastic resin plates 16A, 16B is welded to the corresponding skin sheet 12 in a surface to surface contact manner.

Figure 3:
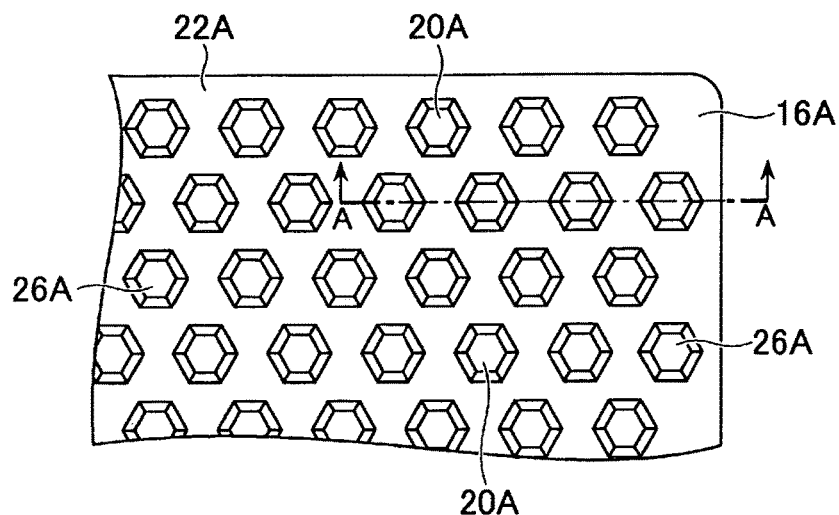
FIG. 3 is a front view showing a core member for the sandwich panel according to the first embodiment of the present invention.

As shown in FIG. 3, each of the plurality of recesses 20A, 20B is shaped to be a truncated pyramid whose opening 26 on the outer surface 22 of the core member is a regular hexagon. The openings 26 are arranged on the outer surface 22 in a honeycomb pattern. This allows for the plurality of recesses 20A, 20B to be arranged on the outer surface 22 of the core member 13 in the most dense manner. With respect to a size of the opening 26, a depth of each of the plurality of recesses 20A, 20B, and a distance between adjacent recesses 20A, 20B, the bigger the size of the opening 26 becomes, the deeper the depth of the recess 20 becomes, and the smaller the distance of the adjacent recesses 20A, 20B becomes, the more the void volume as an entire core member 13 can be improved to reduce its weight, while it is necessary to determine them along with a tapering angle of the recess 20 described below, in view of its stiffness required for an entire sandwich panel 10.

Alternatively, it is preferable that the plurality of recesses 20A, 20B be uniformly distributed on the outer surface 22 of the core member and that the shape of the recesses 20A, 20B be appropriately selected from the various shapes such as a truncated cone, a truncated pyramid, conical shape, cylindrical shape, or hemispherical shape.

In a case where each of the pair of thermoplastic resin plates 16A, 16B is formed by forming a parison P in a molten state positioned between a pair of split molds 50A, 50B and closing the pair of split molds 50A, 50B, as described below, the core member 13 is so formed as to include a sealed space 28 inside at a desired position and to exhibit a desired surface shape, in accordance with an application of the sandwich panel 10, while the core member 13 can be welded to the corresponding thermoplastic resin skin sheet 12 via its surface pressed toward a cavity 52 of the pair of split molds 50A, 50B, whereby the core member 13 with a desired profile, a desired surface shape, and a desired inner structure, in accordance with the application of the sandwich panel 10 can be provided. In particular, a parting line PL is formed to contribute to improving the stiffness of the entire sandwich panel by welding the peripheral edge faces of the opposed thermoplastic resin skin sheets 12 between which the core member 13 is interposed.

Figure 4:
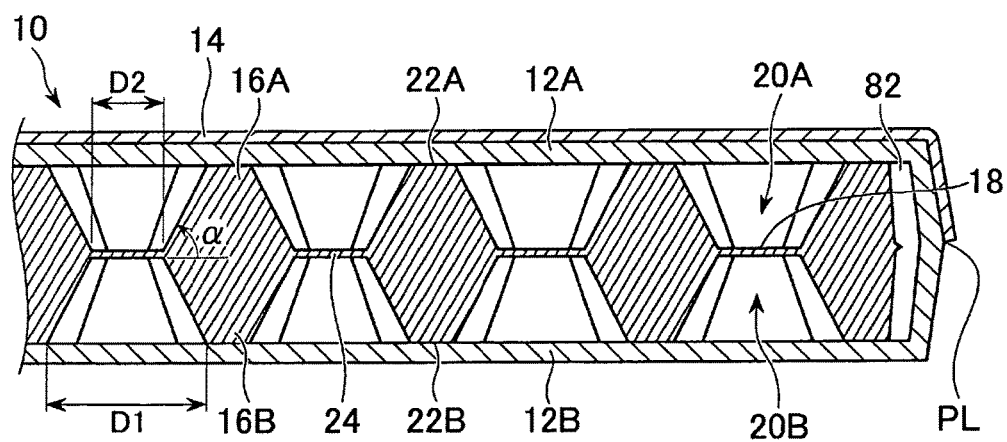
FIG. 4 is a cross sectional view taken along a line A-A in FIG. 3.

As shown in FIG. 4, each of the plurality of recesses 20A, 20B is tapered so as to be inwardly converged. A width (D1) of the opening 26 and a width (D2) of the thin portion constituting a bottom face are appropriately selected in accordance with the thickness of the core member 13. More specifically, under the condition that the thickness of the core member 13 is constant, as the tapering angle (a in FIG. 4) relative to a longitudinal direction of the core member 13 becomes small, D1 becomes big, while D2 becomes small, as compared with a case where the recess 20 is upright ($\alpha$=90). Consequently, since the total opening area on the outer surface 22 of the core member 13 is increased, an adhesive area between the outer surface 22 of the core member 13 and the corresponding skin sheet 12 are caused to decrease, while the total area of the abutting planar portions 24 of the plurality of recesses 20A, 20B constituting an adhesive portion between the pair of thermoplastic resin plates 16A, 16B is also caused to decrease.

Accordingly, in case of the sandwich panel 10 with a light weight and a high stiffness, in order to secure a distance between the skin sheets with high rigidities, a strong adhesiveness between the thermoplastic resin plates 16A, 16B constituting the core member 16A, 16B and a strong adhesiveness between the core member 13 and the skin sheet 12 are required for securing a thickness of the core member 13 as well as the void volume of the core member 13 itself. Based on the above, it is readily understandable that even though the provision of a plurality of recesses 20A, 20B on the core member 13 increases the void volume, an adhesive area between the thermoplastic resin plates 16A, 16B and an adhesive area between the core member 13 and the thermoplastic resin plates 16A, 16B can vary depending on the tapering angle $\alpha$ of the recesses 20A, 20B, which influences on the stiffness as an entire sandwich panel 10.

As stated above, the flexural rigidity of the entire sandwich panel 10 can be improved, while at the same time the weight of the sandwich panel 10 can be reduced by providing the plurality of recesses 20A, 20B on the surface of each of the pair of the thermoplastic resin plates 16A, 16B and abutting one of the thermoplastic resin plates 16A, 16B against the other of the thermoplastic resin plates 16A, 16B to increase the thickness of the core member 13, thereby causing the distance between the two skin sheets 12 to increase.

In such a case, the larger the thickness of the core member 13 becomes, the more the flexural rigidity can be improved due to the two separated skin sheets 12, while, the smaller the tapering angle $\alpha$ of the recess 20 relative to the horizontal line becomes, the more flexural rigidity can be deteriorated.

Under the condition that the thickness is constant, as the tapering angle $\alpha$ of each of the plurality of recesses 20A, 20B relative to the horizontal line becomes small, the opening 26 of each of the plurality of recesses 20A, 20B on the surface of each of the thermoplastic resin plates 16A, 16B becomes large, while the area of the abutting planar portions 24 of the recesses 20A, 20B becomes small, so that the adhesive area between each of the pair of the thermoplastic resin plates 16A, 16B and the corresponding skin sheet 12 and the abutting area at which one of the pair of the thermoplastic resin plates 16A, 16B abuts against the other thereof are decreased, and as a result, the improvement of the flexural rigidity of the sandwich panel 10 due to the adhesive fixation between each of the pair of the thermoplastic resin plates 16A, 16B and the corresponding skin sheet 12 is decreased.

Such being the case, the weight of the sandwich panel 10 can be reduced, while at the same time, the desired flexural rigidity thereof can be obtained in accordance with the application of the sandwich panel 10 by determining the tapering angle $\alpha$ of each of the plurality of recesses 20A, 20B based on the interrelationship among the distance between the two skin sheets 12, the total adhesive area between each of the two skin sheets 12 and the corresponding thermoplastic resin plate 16A, 16B and a total abutting area of the pair of thermoplastic resin plates 16A, 16B in view of the flexural rigidity required for the sandwich panel 10.

In particular, in a case where each of the pair of thermoplastic resin plates 16A, 16B is formed by closing the pair of split molds 50A, 50B by means of blow-molding or vacuum-forming, as the thickness of the core member 13 becomes thick, the blow-up ratio becomes big, so that sagging is generated around the opening 26 of each of the plurality of recesses 20A, 20B provided on the surface of each of the pair of thermoplastic resin plates 16A, 16B, and thus, the flatness of the surface is deteriorated, whereby it becomes difficult to secure an adhesiveness between the pair of thermoplastic resin plates 16A, 16B and the corresponding skin sheet 12. On the other hand, under the condition that the thickness of the core member 13 is constant, the smaller the tapering angle $\alpha$ of each of the plurality of recesses 20A, 20B relative to the horizontal line becomes, the larger the opening 26 of the recess 20 becomes, whilst the area of the abutting planar portions 24 becomes smaller.

Accordingly, in order to secure the adhesiveness between the skin sheet 12 and the core member 13, in accordance with the flexural rigidity required for the sandwich panel 10, by determining the relationship between the thickness of the core member 13 and the tapering angle $\alpha$ of each of the plurality of recesses 20A, 20B, a bad influence on the adhesiveness due to the blow-up ratio can be restricted, while the area of the abutting planar portions 24 of each of the plurality of recesses 20A, 20B forming an adhesive area between the pair of thermoplastic resin plates 16A, 16B can be secured. In addition, the stiffness of the core member 13 itself can be secured while it has a hollow portion 28 by the fact that the void volume of the sandwich panel 10 is secured by increasing the opening area of the plurality of recesses 20A, 20B provided on the surface of each of the pair of thermoplastic resin plates 16A, 16B, while at the same time, the weight of the sandwich panel 10 can be reduced and the stiffness thereof can be improved by making the stiffness of the skin sheet higher than that of the core member 13 while securing sufficient adhesiveness between the core member 13 and the skin sheet 12.

In this connection, the abutting planar portion 24 may be formed by an annular open edge formed on the opposed surface of each of the pair of thermoplastic resin plates 16A, 16B, so that the core member 13 with perforated holes may be formed by welding the abutting planar portion of each of the plurality of recesses 20A, 20B of one of the pair of thermoplastic resin plates 16A, 16B to that of the corresponding recess 20 of the other of the pair of thermoplastic resin plates 16A, 16B in a back to back manner.

Figure 5:
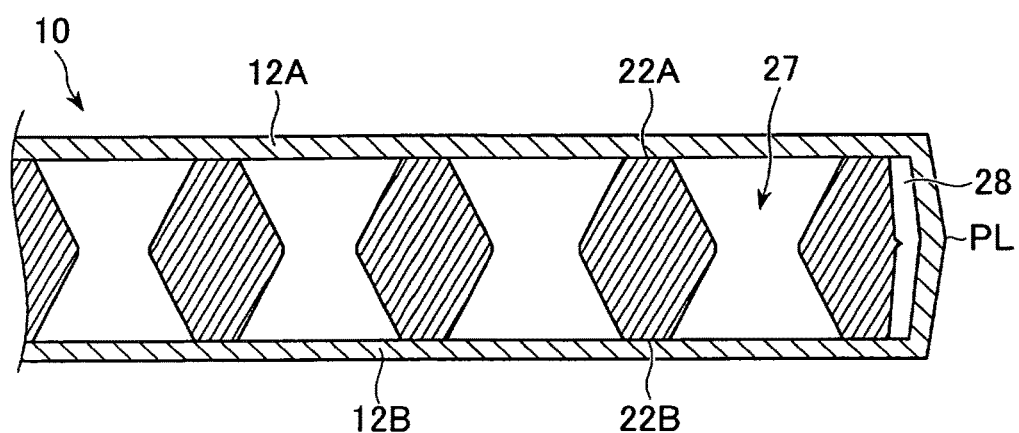
FIG. 5 is a cross sectional view showing an alternative sandwich panel.

Alternately, as shown in FIG. 5, a perforated hole 27 may be formed by removing the thin portion shown in FIG. 4. In addition, the void volume may be further improved by providing a hollow portion in a solid portion between the adjacent recesses 20A, 20B.

In the present invention, the core member 13 may be made of thermoplastics including polyolefin (polypropylene, high-density ethylene, for instance) which is a homopolymer or copolymer of olefin such as ethylene, propylene, butene, isoprenepentene, methylpentene, etc., polyamide, polystyrene, polyvinyl chloride, polyacrylonitrile, acrylic resin such as copolymer of ethylene-ethyl acrylate, etc., polycarbonate, copolymer of vinyl acetate resin such as copolymer of ethylene-vinyl acetate, inonomer, terpolymer such as ethylene-propylene-diene, etc., ABS resin, polyolefinoxide, polyacetal, etc.

In this connection, a single kind of the above thermoplastics may be used, or two or more kinds thereof may be blended. In particular, resin comprising polyolefin or mainly olefin resin, or polypropylene may be preferable, since a good balance among adhesion properties to the fiber layer, a mechanical strength, and the molding properties is maintained. Additive including inorganic filler such as silica, mica, talc, calcium carbonate, glass fiber, carbon fiber, etc., plasticizer, stabilizer, color, antistatic, flame-retardant, foaming agent may be added to the core member 13.

In the present invention, the skin sheet 12 is a sheet formed of polypropylene, engineering plastics, or olefin plastics.

From the viewpoint of achieving stiffness—in particular, flexural rigidity of an entire sandwich panel by increasing the distance between the skin sheets 12 each of which is provided on the corresponding side of the core member 13—the stiffness of the skin sheet 12 is required to be higher than that of the core member 13.

More specifically, the skin sheet 12 may be preferably made of resin material with a higher tensile strength in a molten state, in order to prevent variability of the thickness of the skin sheet 12 from being generated due to draw-down or sagging, while a resin material with a high fluidity may be preferably adopted in order to improve its characteristics in which it is formed along the shape of the pair of molds 50A, 50B.

More concretely, polyolefin (polypropylene, high-density polyethylene, for instance) which is a homopolymer or copolymer of olefin such as ethylene, propylene, butene, isoprenepentene, methylpentene and a value of MFR (which is measured at 230° C. under the test load of 2.16 kg pursuant to JIS K-7210) of which is less than, or equal to 3.0 g/10 min, more preferably, between 0.3 and 1.5 g/10 min may be adopted.

Alternatively, non-crystalline resin such as copolymer of acrylonitrile butadiene styrene (ABS resin), polystyrene, high impact polystyrene (HIPS resin), copolymer of acrylonitrile styrene (AS resin), etc. and a value of MFR (which is measured at 200° C. under the test load of 2.16 kg pursuant to JIS K-7210) of which is between 3.0 and 60 g/10 min, more preferably, between 30 and 50 g/10 min, and a value of MT of which is more than, or equal to 50 mN, more preferably, more than, or equal to 120 mN may be adopted.

In this connection upon MT being measured, a strand is extruded from an orifice with a diameter of 2.095 mm and a length of 8 mm at a preheat temperature of 230° C. under the extruding speed of 5.7 mm/min, and a tension generated on the strand when it is wound up by a roller with a diameter of 50 mm at a winding speed of 100 rpm is measured using a melt tension tester of TOYO SEIKI SEISAKUSHO.

In order to prevent cracks from being generated on the skin sheet 12, less than 30 wt %, more preferably, less than 15 wt % of hydrogenated styrene thermoplastic elastomer may be added. More specifically, a mixture of a block copolymer of styrene ethylene butylene styrene, a block copolymer of styrene-ethylene-propylene-styrene, and hydrogenated styrene-butadiene rubber may be preferable for hydrogenated styrene of the thermoplastic elastomer. Less than 30 wt %, more preferably, less than 20 wt % of styrene may be contained, and the value of MFR (which is measured at a temperature of 230° C. under the test load of 2.16 kg pursuant to JIS K-7210) may be between 1.0 and 10 g/10 min, more preferably, between 1.0 and 5.0 g/10 min.

In addition, additive including inorganic filler such as silica, mica, talc, calcium carbonate, glass fiber, carbon fiber, etc., plasticizer, stabilizer, color, antistatic, flame-retardant, foaming agent may be added to the skin sheet 12, similar to the core member 13.

More specifically, less than or equal to 50 wt %, more preferably, between 30 and 40 wt % of silica, mica, glass fiber, etc. may be added to the resin to be formed.

In a case where the decoration sheet 14 is provided on the surface of the skin sheet 12, the decoration sheet 14 is constituted in order to improve an external appearance and a decorative effect and protect an article which contacts the formed product (in case of the cargo floor board, luggage rested on an upper surface thereof, for instance). Fiber sheet-like skin, film-like skin, etc. is applied to the decoration sheet 14. Such a fiber skin may be made of synthetic fiber such as polyester polypropylene, polyamide, polyurethane, acrylic, vinylon, semisynthetic fiber such as acetate, rayon, regenerated fiber such as viscose rayon, cuprammonium rayon, etc., natural fiber such as cotton, jute, wool, silk, etc., and blended fiber in which these fibers are blended.

Among these fibers, in view of feel, durability and molding properties, polypropylene or polyester may be preferable, polyester may be more preferable. Yarns used for the fiber skin may be spurn yarn of staple with a fineness of 3 to 15 denier such as polyester with (3 to 5) denier and (50 to 100) mm, and multi-filament of thin flexible filament with about 5 denier and 30 to 200 or a thick mono-filament such as polyester with 400 to 800 denier/1 filament may be combined.

The decoration sheet 14 may be made of unwoven fabric, woven textile, knitted web, raised cloth in which these are raised. In this connection, the woven textile includes a plain weave fabric in which warps and wefts are upwardly and downwardly interwoven in an alternate manner, and various change weave in which yarns are interwoven with several yarns being passed over. Among these, the unwoven fabric may be preferable, since it can be readily formed into a three dimensional shape due to the fact that it has no directional property related to an extension, and its surface has good feel and suitability. In this case, the unwoven fabric is defined to be a textile product which is made by laminating fibers in parallel or in a crossing manner, or randomly distributing fibers to form webs, and then, joining formed webs. In view of a reproducibility of the three dimensional shape and the external appearance of the formed product, the unwoven fabric manufactured by a needle-punch method may be preferable. In addition, since the unwoven fabric manufactured by the needle-punch method has a strength smaller than the woven fabric and an extensibility larger than the woven fabric, so that it tends to be easily deformed in any direction, it may be preferable that binder be attached to the fabric, or that the web and the unwoven fabric be punched together by lap needles in order to improve the strength of the unwoven fabric and to stabilize its size. In view of the above, the decoration sheet 14 may be preferably made of polypropylene or polyester. In this case, since the decoration sheet 14 is thermoplastic, it can be used for another application by removing and recovering it and heating it to deform. For instance, a recycle process can be readily carried out by the fact that a main resin layer is made of polypropylene, while the decoration sheet 14 is made of polypropylene unwoven fabric same as the main resin layer.

On the other hand, if the decoration sheet 14 is made of polyester unwoven fabric, since the melt point of the main resin layer made of polypropylene is different from that of the fiber skin, troubles that change of properties of the formed product is caused, or that the formed product can be deformed, or that the decoration 14 cannot be precisely adhered to the formed product, due to the heat, can be restricted in a case where the formed product is adhered to the decoration sheet 14. In addition, the molding properties, the stiffness, the external appearance, and the durability of the formed product are maintained. Further, the tensile strength of the decoration sheet 14 may be preferably higher than, or equal to 15 kg/cm$^2$ and the extensibility thereof may be preferably higher than, or equal to 30%, in view of the reproducibility of three dimensional shape and the molding properties. In this connection, such a tensile strength and extensibility are measured at a temperature of 20° C. pursuant to JIS-K-7113. A thermoplastic elastomer, embossed resin layers, resin layers an outer surface of which a printed layer is attached to, synthetic leather, meshed skin layers with slip resistance, etc. may be used for the sheet-like skin and the film-like skin.

Figure 6:
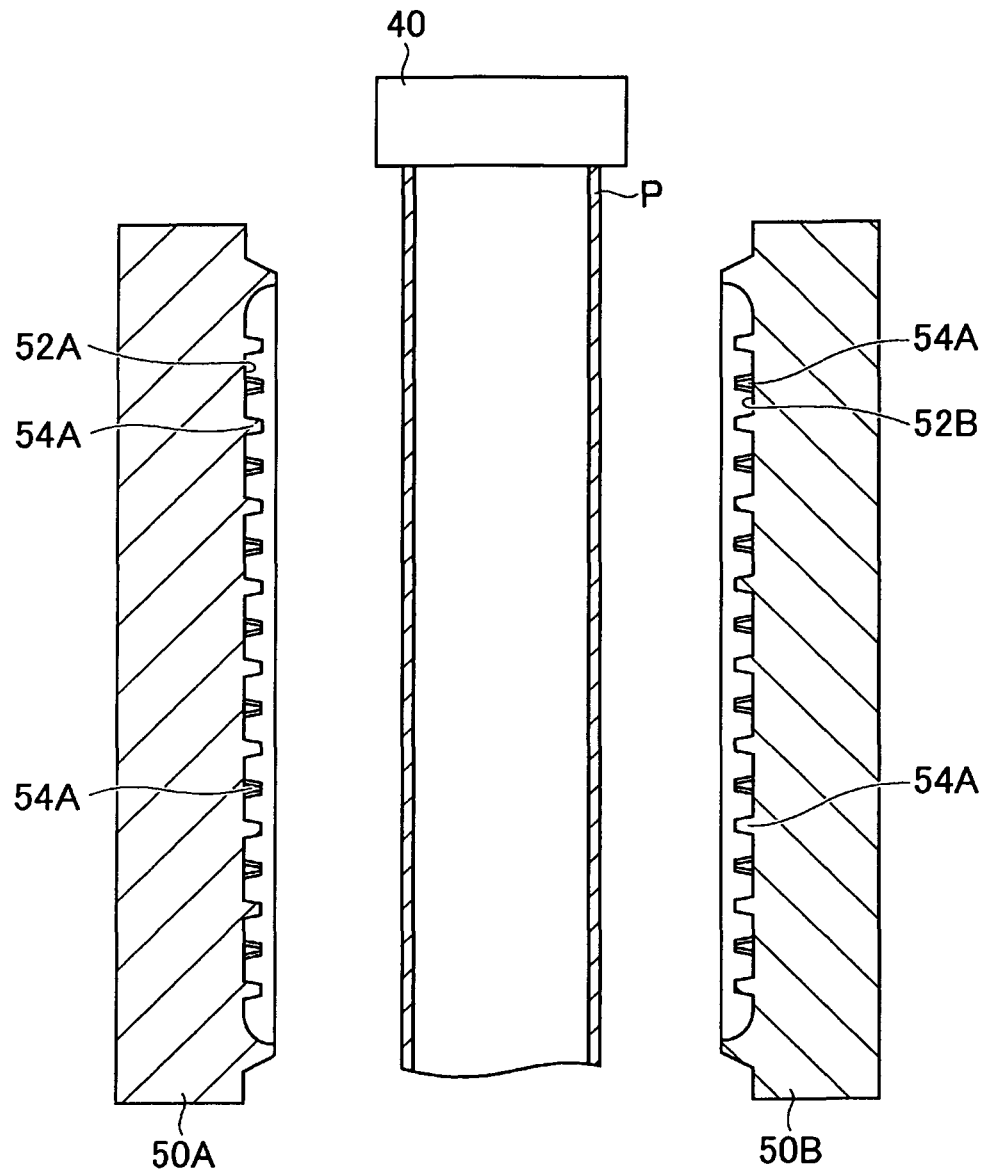
FIG. 6 is a view showing a situation before a step of closing molds by which the sandwich panel according to the first embodiment of the present invention is formed.

The extrusion head 40 and the pair of split molds 50A, 50B which form the core member 13 including the above structure are both conventional types. As shown in FIG. 6, each of the pair of split molds 50A, 50B is disposed in such a way that a respective cavity 52A, 52B of one of the pair of split molds 50A, 50B which forms the parison P fed between the pair of split molds 50A, 50B is opposed to a respective cavity 52B, 52A of the other of the pair of split molds 50A, 50B. A plurality of protrusions 54A, 54B are formed on the surface of each respective cavity 52A, 52B. Each of the plurality of protrusions 54A, 54B tapers toward the opposed one of the pair of split molds 50A, 50B in a convergent manner. This causes the plurality of protrusions 54A, 54B to be readily removed from the core member 13 having been formed in a case where the pair of split molds 50A, 50B are opened after the core member 13 is formed at a position where the pair of split molds 50A, 50B are closed. It is preferable that the tapering angle α be at least more than 75° relative to the longitudinal direction of the core member 13. Each of the plurality of protrusions 54A, 54B is shaped to be a truncated pyramid with a regular hexagon bottom. This causes the parison P in a molten state within the pair of split molds 50A, 50B to be pressed against the corresponding cavity 52A, 52B in a case where the a pair of split molds are closed, whereby the plurality of protrusions 54A, 54B are inserted into the surface of the parison P in a molten state opposed to the corresponding cavity 52A, 52B, and as a result, a plurality of recesses 20A, 20B, a shape of each of which is complementary to the profile of the corresponding protrusions 54A, 54B are formed on the opposed surface.

Next, a method of forming the core member 13 will be explained about.

Firstly, as shown in FIG. 6, a tubular parison P in a molten state is vertically and downwardly extruded from a known extrusion head 40 through a slit-die to be fed between the pair of split molds 50A, 50B which are opened.

Figure 7:
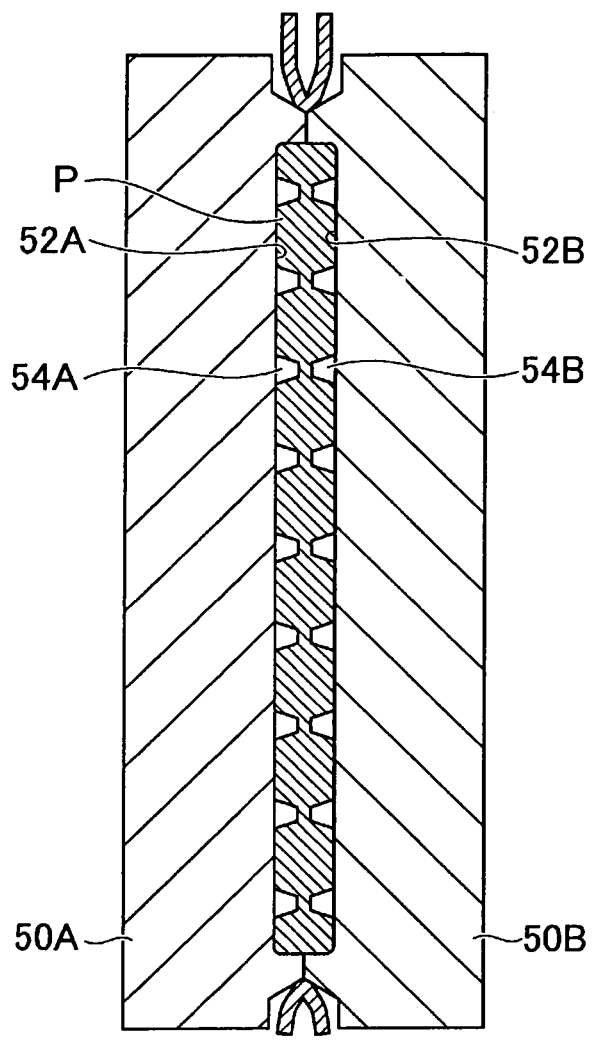
FIG. 7 is a view showing a situation in which the molds by which the sandwich panel according to the first embodiment of the present invention is formed are closed.

Then, as shown in FIG. 7, the pair of split molds 50A, 50B are moved from an open position to a closed position to be clamped. This causes a sealed space to be defined.

Then, the parison P in the sealed space is pressed against the cavities 52A, 52B by the blow-molding or the vacuum forming through the sealed space to be formed along the cavities 52A, 52B.

More specifically, in the case of blow-molding, similar to the conventional process, the parison P is pressed against the cavities 52A, 52B by introducing a blow-pin (not shown) into the core member 13 and injecting a pressurized fluid inside of the core member 13, while, in the case of vacuum forming, similar to the conventional process, the parison P is sucked toward the cavities 52A, 52B to be pressed against the cavities 52A, 52B by providing a flow passage (not shown) communicating with the sealed space inside the pair of split molds 50A, 50B and sucking on air within the sealed space via the flow passage.

This allows for the thermoplastic resin plates 16A, 16B to be formed based on the continuous tubular parison P in a molten state. The plurality of recesses 20A, 20B corresponding to the plurality of protrusions 54A, 54B are formed on the surface of each of the pair of thermoplastic resin plates 16A, 16B opposed to the corresponding cavities 52A, 52B by inserting the plurality of protrusions 54A, 54B into the opposed surface. Each of the plurality of recesses 20A, 20B is so formed as to protrude at the side of the surface opposite to the opposed surface, that is, an inner surface 18, whereby each of the plurality of recesses 20A, 20B is formed with an abutting planar portion 24 forming a bottom (see FIG. 4).

In such a case, the abutting planar portion 24 of each of the plurality of recesses 20A, 20B on one of the pair of thermoplastic resin plates 16A, 16B and the corresponding abutting planar portion 24 of each of the plurality of recesses 20A, 20B on the other of the pair of thermoplastic resin plates 16A, 16B are welded to each other by making an arrangement of the plurality of protrusions 54 on the cavities 52A, 52B of one of the pair of split molds 50A, 50B the same as that on the cavities 52A, 52B of the other of the pair of split molds 50A, 50B. In addition, a parting line PL (shown in FIG. 4) is formed on peripheral edge portions of the two tubular parisons P to be welded to each other by the fact that pinch-off portions of the pair of split molds 50A, 50B abut against each other.

Figure 8:
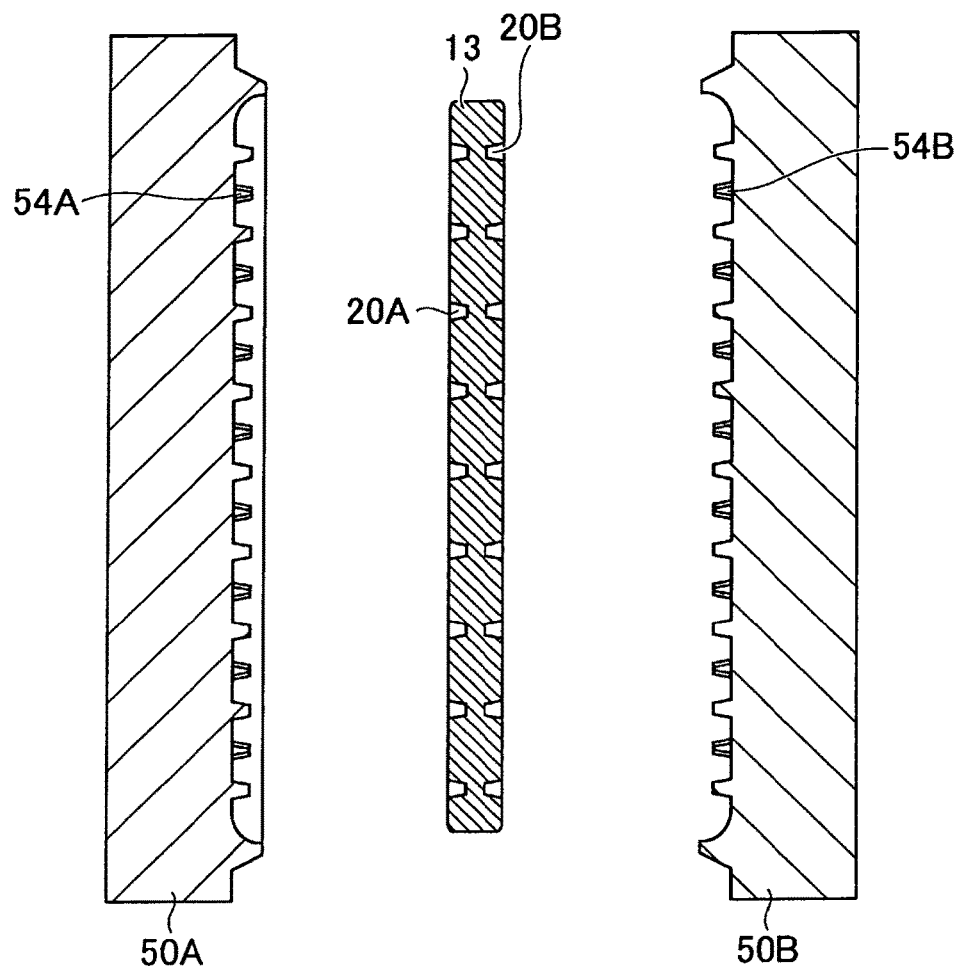
FIG. 8 is a view showing a situation in which the molds by which the sandwich panel according to the first embodiment of the present invention is formed are opened.

Then, as shown in FIG. 8, the pair of split molds 50A, 50B are moved from the closed position to the open position by mold driving device. Then, the formed core member 13 is removed from the open split molds 50A, 50B. This completes the forming of the core member 13.

Figure 9:
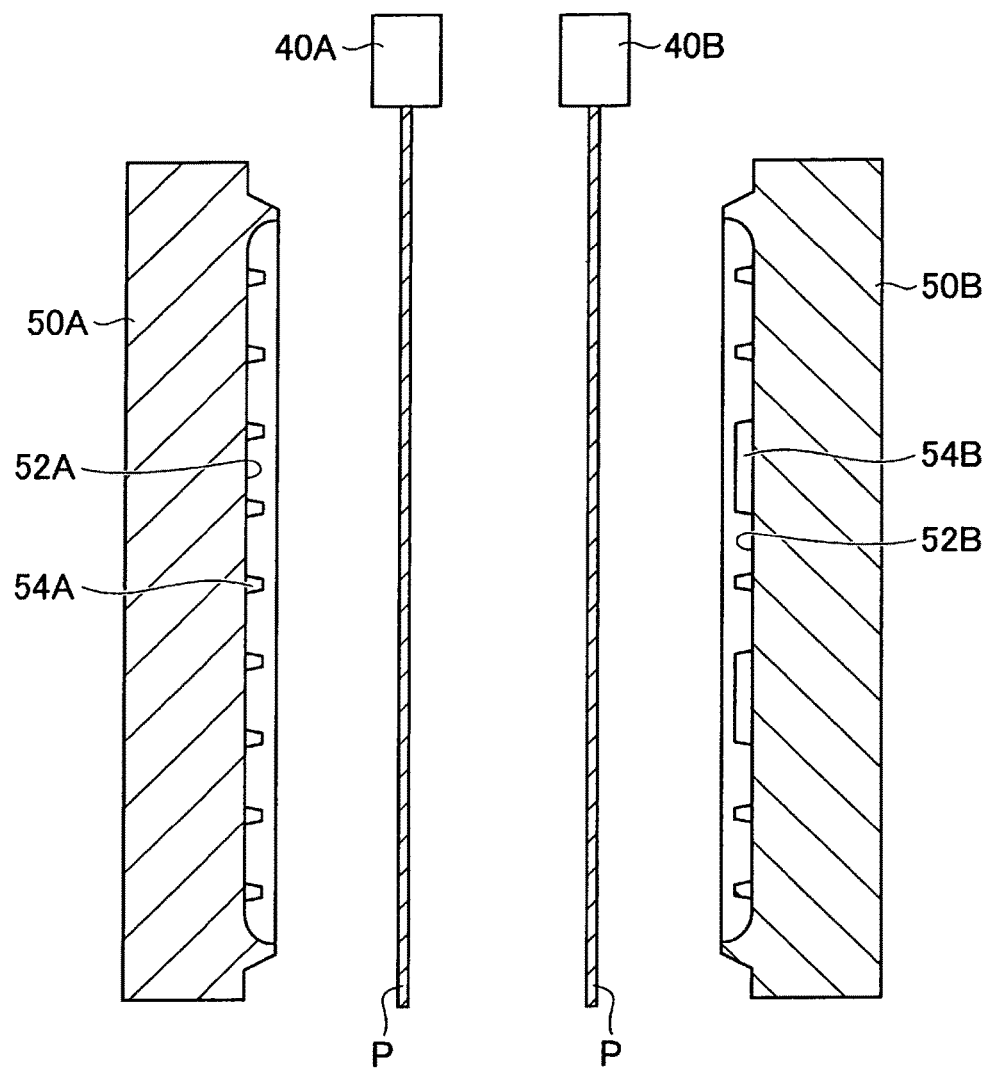
FIG. 9 is a view similar to FIG. 6 showing a situation before a step of closing the molds by which the sandwich panel according to another embodiment of the present invention is formed.
Figure 10:
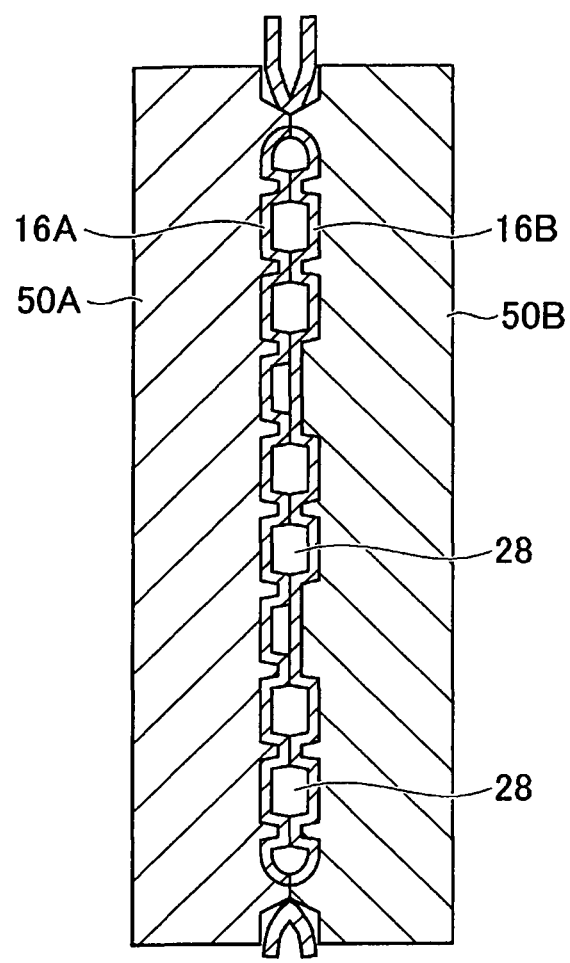
FIG. 10 is a view similar to FIG. 7 showing a situation in which the molds by which the sandwich panel according to another embodiment of the present invention is formed are closed.
Figure 11:
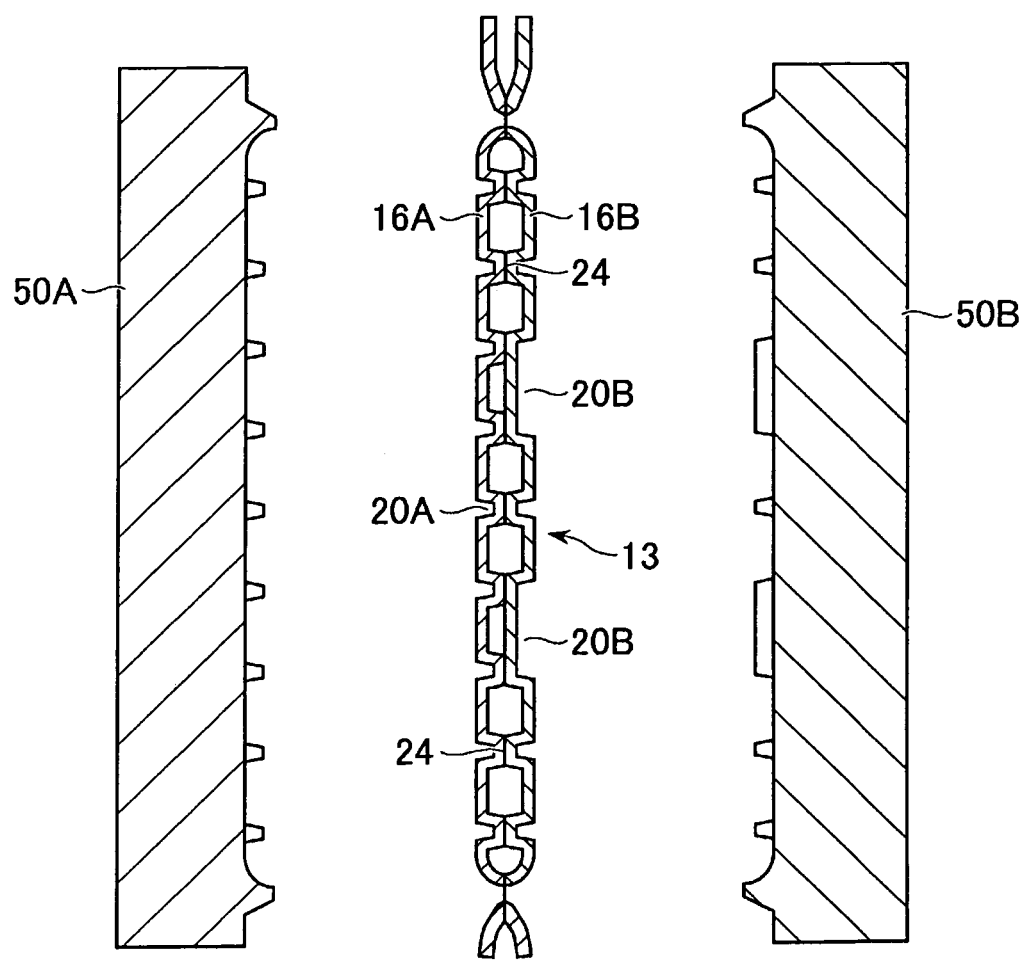
FIG. 11 is a view similar to FIG. 8 showing a situation in which the molds by which the sandwich panel according to the first embodiment of the present invention is formed are opened.

Each of FIGS. 9 to 11 shows an alternative in which the core member 13 with recesses 20A, 20B of different sizes being distributed is provided, whereby the inner structure of the core member 13 varies along its longitudinal direction (vertical direction). In this embodiment, two extrusion heads 40A, 40B each of which extrudes a continuous sheet-like parison P are provided. In FIG. 9 to FIG. 11, with respect to the continuous sheet-like parison P on the right side, the recesses 20B of different sizes are unevenly distributed, while, with respect to the continuous sheet-like parison P on the left side, the recesses 20A of the same size are evenly distributed along the longitudinal direction (vertical direction), as in FIGS. 4 to 8.

In view of the above, as shown in FIG. 9 to FIG. 11, the protrusions 54B of different sizes are provided on the cavity 52B of one mold 50B of the pair of split molds 50A, 50B on the right side. More specifically, recesses 20B with comparatively long widths in the longitudinal direction (vertical direction) besides the recesses 20A with a truncated pyramid, similar to FIG. 4 to FIG. 8, are provided. As shown in FIG. 10, recesses 20B with wide abutting bottoms are formed on the continuous sheet-like parison P on the right side by the closing of the pair of split molds 50A, 50B. Two abutting bottoms of the recesses 20A which are formed on the continuous sheet-like parison P on the left side abut against one of the abutting bottoms of the recesses 20B on the right side.

According to the core member 13 with the above structure, strength can be locally obtained in a desired manner by varying the inner structure in the longitudinal direction of the core member 13.

According to the method of forming the thermo plastic core member 13 including the above construction, a sealed space is formed inside the pair of split molds 50A, 50B by positioning a parison P in a molten state made of a thermo plastic between the two split molds 50A, 50B so as to protrude around the cavities 52A, 52B of the split molds 50A, 50B, and closing the two split molds 50A, 50B. The core member 13 for a sandwich panel with a desired profile, a desired surface shape and a desired inner structure can be provided in accordance with an application of the sandwich panel based on the irregular portions provided on the respective cavities 52A, 52B of each of the split molds 50A, 50B by pressurizing the parison P in the sealed space (blow molding), or by sucking the parison P in the sealed space through the closed pair of split molds (vacuum forming).

As an alternative to the method of forming a core member 13 made of a thermo plastic for a sandwich panel, the parison P in a molten state may be formed before the pair of split molds 50A, 50B are closed. More specifically, said method may comprise steps of positioning two sheet-like parisons P made of thermal plastic between a pair of split molds 50A, 50B in such a way that said parisons P protrude around cavities 52A, 52B of said pair of split molds 50A, 50B, forming a sealed space between said respective cavities 52A, 52B of each of the pair of split molds 50A, 50B and said corresponding sheet-like parison P by bringing said corresponding sheet-like parison P into abutment with a pair of protrusions (not shown) which are disposed to be spaced apart from each other on one said cavity 52A, 52B and protrude from said cavity 52A, 52B toward the other cavity 52B, 52A, forming said sheet-like parisons P by sucking said sheet-like parisons P through said sealed space to press said sheet-like parisons P against the cavities 52A, 52B of said pair of split molds 50A, 50B, and closing said pair of split molds 50A, 50B to weld said two sheet-like parisons P, whereby a sealed hollow portion is formed inside the sheet-like parisons P, while at the same time a plurality of recesses 20A, 20B or a plurality of perforated holes are provided on surfaces of said sheet-like parisons P by a parting line PL being formed around peripheral edges of said welded two sheet-like parisons P.

In such a case, said forming step may comprise a step of forming a plurality of recesses 20A, 20B corresponding to a plurality of protrusions 54A, 54B which are provided respectively on the cavities 52A, 52B of at least one of the pair of split molds 50A, 50B and each of which tapers so as to converge toward the opposed split mold, on the surface of the corresponding sheet-like parison P by pressing it against said plurality of protrusions 54A, 54B.

Next, an apparatus and a method of forming a sandwich panel 10 using a mold based on the above formed core member 13 will be explained.

Figure 12:
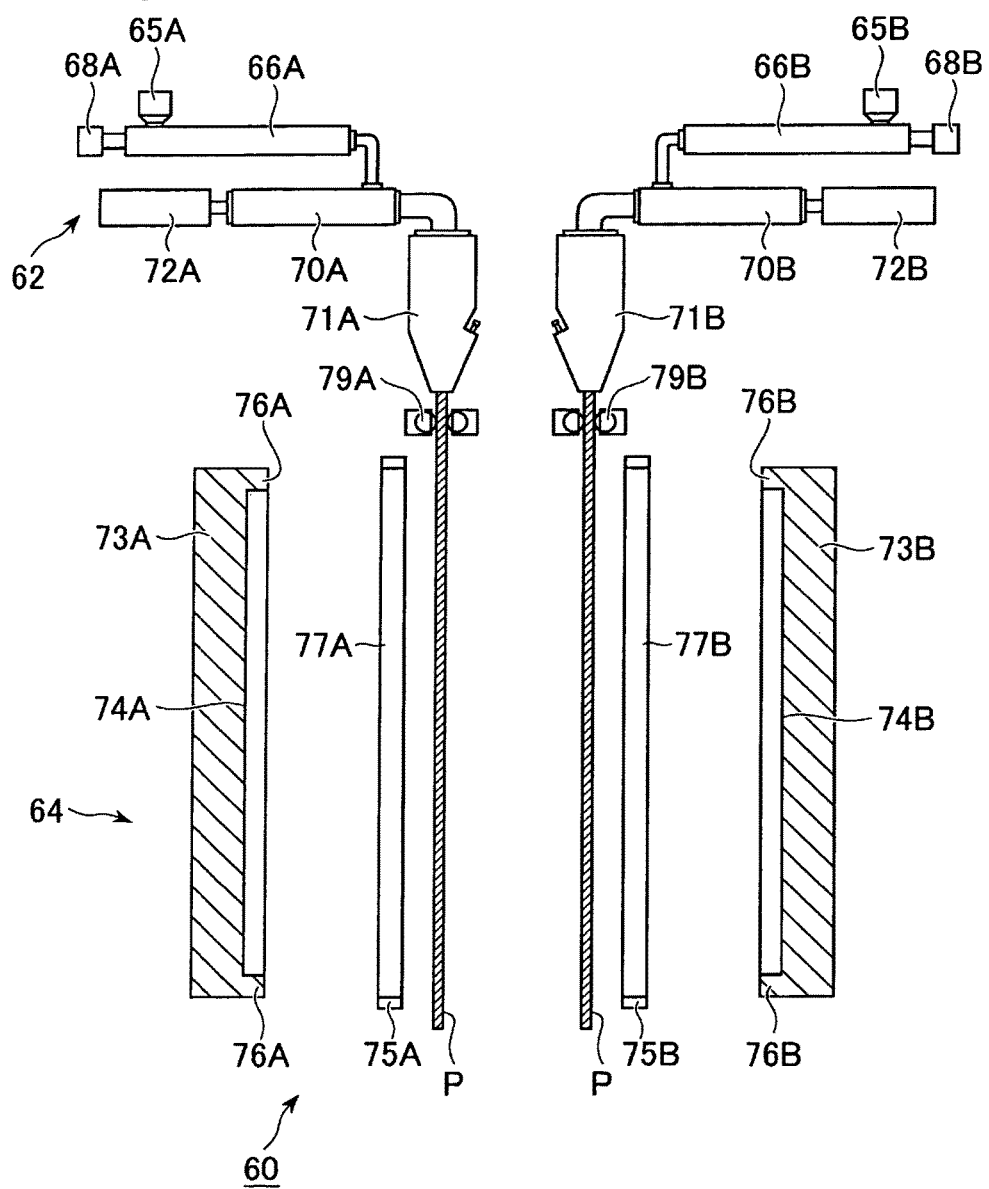
FIG. 12 is a general view showing an apparatus for forming the sandwich panel according to the first embodiment of the present invention.

As shown in FIG. 12, the apparatus 60 for forming the sandwich panel comprises an extrusion device 62 and a clamping device 64 disposed to be below the extrusion device 62. A parison P in a molten state extruded from the extrusion device 62 is adapted to be fed to the clamping device 64 by which the parison P is formed.

The extrusion device 62 is of the conventional type, so that a detailed explanation thereof is omitted. The extrusion device 62 comprises cylinders 66A, 66B on which respective hoppers 65A, 65B are provided, respective screws (not shown) provided inside the cylinders 66A, 66B, respective hydraulic motors 68A, 68B connected to the screws, accumulators 70A, 70B, the insides of which respectively communicate with the cylinder 66A, 66B, and plungers 72A, 72B respectively provided inside the accumulators 70A, 70B. Resin pellet from the hoppers 65A, 65B is fused and mixed in the cylinders 66A, 66B by the rotation of the screws driven by the hydraulic motors 68A, 68B, and then, the resin in a molten state is transported to the accumulators 70A, 70B where a predetermined amount of resin is stored. Then, the resin in a molten state is fed to respective T-dies 71A, 71B by the drives of the respective plungers 72A, 72B, whereby a continuous sheet-like parison P is extruded through a die-slit (not shown) in each of T-dies 71A, 71B to be downwardly fed being sandwiched by respective pairs of rollers 79A, 79B disposed to be apart from each other, and as a result, is the sheet-like parisons P are positioned between the pair of split molds 73A, 73B in a suspended form. This allows for the sheet-like parisons P to be disposed between the pair of split molds 73A, 73 being tensioned without generating wrinkles or sagging.

The extruding capacity of the extrusion device 62 may be appropriately selected in view of the size of the skin sheet to be formed and to prevent generating draw-down of each parison P. More specifically, from a practical point of view, the extrusion speed at which the resin is extruded from the die-slit may be preferably higher than several hundreds kg/hour, more preferably, higher than 700 kg/hour. In addition, from the viewpoint of preventing draw-down of each parison P, the time period of the process of extruding the parisons P may preferably be as short as possible. More specifically, although it depends on the kind of the resin and the value of MFR, in general, it may be within 40 seconds, more preferably, within 30 seconds. In view of the above, the amount of the extrusion of the thermoplastic resin from the die-slit per unit area and unit time may preferably be more than 50 kg/hour/cm$^2$, more preferably, more than 50 kg/hour/cm$^2$.

The die-slits are disposed to be vertically and downwardly oriented, so that the continuous sheet-like parisons P extruded from the die-slits are adapted to be vertically and downwardly fed as they are being suspended from the die-slits. The width of the die-slits can be changed so that the thickness of the continuous sheet-like parisons P can be varied.

On the other hand, the clamping device 64 is also of the conventional type, like the extrusion device 62, so that a detailed explanation thereof is omitted. The clamping device 64 comprises a pair of split molds 73A, 73B and a mold driving device which moves the pair of split molds 73A, 73B between an open position and a closed position in a direction substantially perpendicular to that in which the continuous sheet-like parisons P in a molten state are fed.

The pair of split molds 73A, 73B are disposed in such a way that the respective cavities 74A, 74B of the pair of split molds 73A, 73B are opposed to each other. Each of the cavities 74A, 74B is disposed to be vertically and downwardly oriented. An irregular portion is provided on the surface of each of the cavities 74A, 74B in accordance with the profile and the pattern of the skin sheet 12 to be formed based on the continuous sheet-like parison P.

Respective pinch-off portions 76A, 76B are formed around the cavities 74A, 74B in each of the split molds 73A, 73B. The pinch-off portions 76A, 76B are formed to be annular around the cavities 74A, 74B when the split molds 73A, 73B are in the closed position, and protrude toward the opposed molds 73B, 73A. This allow for a parting line PL to be formed around the peripheral edge of the parisons P in a molten state by the fact that tip ends of the respective pinch-off portions 76A, 76B abut against each other when the pair of split molds 73A, 73B is closed.

A pair of frame members 75A, 75B are disposed substantially in parallel with the respective cavities 74A, 74B between the pair of split molds 73A, 73B in a telescoped manner. Each of the pair of frame members 75A, 75B includes a respective opening 77A, 77B and is moved horizontally by a frame member driving device (not shown). This allows for each of the pair of frame members 75A, 75B to move toward the corresponding parison P in a molten state, thereby causing the corresponding parison P to be held, and then, to reversely move while the corresponding parison P is held until the tip end of the respective pinch-off portion 76A, 76B of the corresponding mold 73A, 73B abuts against the surface of the parison P through the opening 76A, 76B.

The mold driving device is of the conventional type, so that a detailed explanation thereof is omitted. Each of the split molds 73A, 73B is driven by the mold driving device in such a way that two continuous sheet-like parisons P in molten states can be disposed between the pair of split molds 73A, 73B to be spaced apart from each other at the open position, while the pinch-off portions 76A, 76B of the pair of split molds 73A, 73B abut against each other in the closed position, so that a sealed space is formed inside the pair of split molds 73A, 73B by the annular pinch-off portions 76A, 76B abutting against each other. In this connection, with respect to the movement of each of the pair of split molds 73A, 73B between the open position and the closed position, the closed position is set to be a center line of the two sheet-like parisons P in molten states, so that each of the pair of split molds 73A, 73B is adapted to move toward the center line by the mold driving device.

Next, a method of forming the sandwich panel 10 will be explained.

Figure 13:
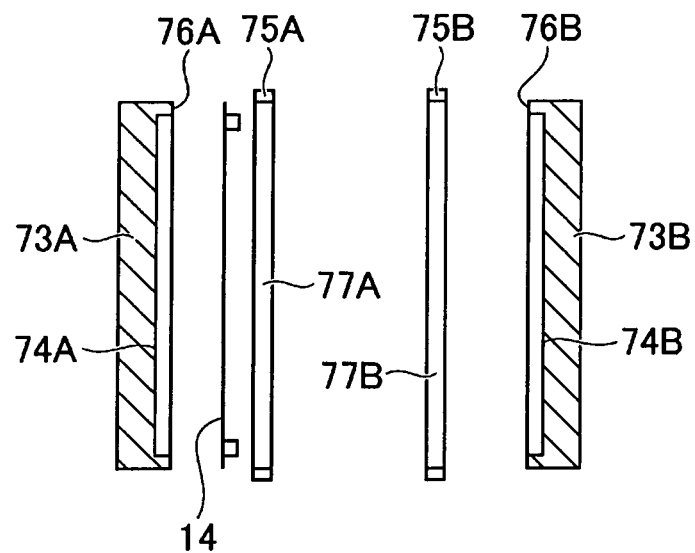
FIG. 13 is a view showing a situation in which a decoration sheet 14 is positioned between the pair of split molds in the process of forming the sandwich panel according to the first embodiment of the present invention.

Firstly, as shown in FIG. 13, a decoration sheet 14 is inserted between one of the pair of split molds 73A, 73B and the corresponding one of the pair of frame members 75A, 75B from the side of the pair of split molds 73A, 73B, and the sheet-like decoration sheet 14 is temporarily fixed so as to cover the cavity 74A, 74B of one of the pair of split molds 73A, 73B by a pin (not shown) provided on one of the pair of split molds 73A, 73B.

Figure 14:
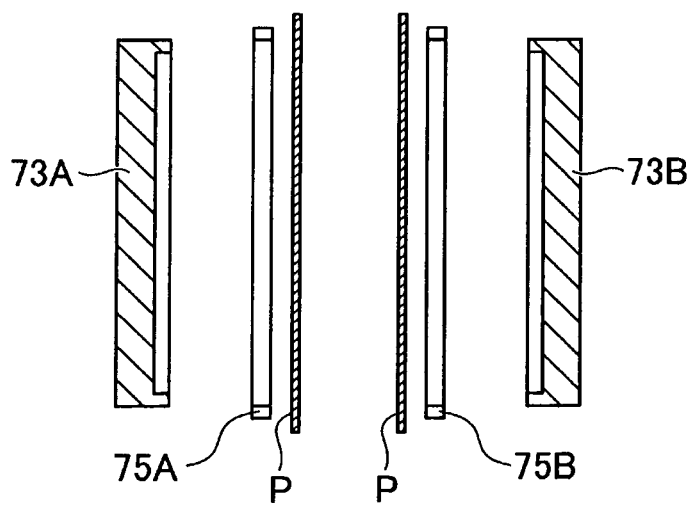
FIG. 14 is a view showing a situation in which a skin sheet is positioned between the pair of split molds in the process of forming the sandwich panel according to the first embodiment of the present invention.

Then, as shown in FIG. 14, each of the two continuous sheet-like thermoplastic resin parisons P in a molten state is vertically and downwardly extruded from the corresponding die-slit to be fed between the pair of split molds 73A, 73B, while each of the pair of the frame members 75A, 75B is moved toward the corresponding parison P by the frame member driving device.

Figure 15:
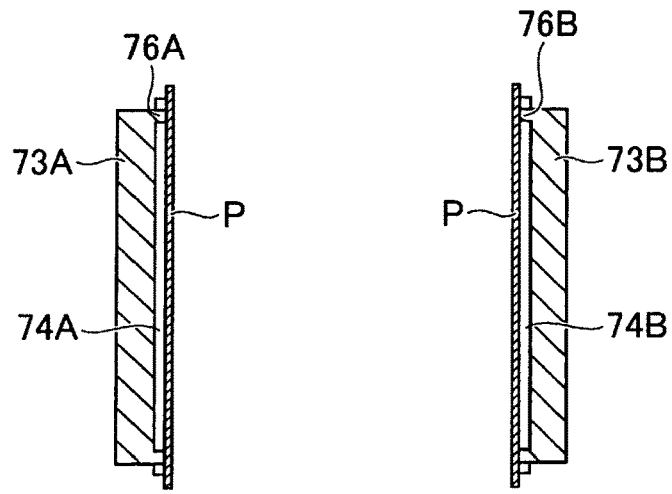
FIG. 15 is a view showing a situation in which the skin sheet is abutted against the pair of split molds in the process of forming the sandwich panel according to the first embodiment of the present invention.

Then, as shown in FIG. 15, each of the pair of the frame members 75A, 75B holding the corresponding parison P is moved toward the corresponding one of the pair of split molds 73A, 73B until the surface of the corresponding parison P opposed to the corresponding cavity 74A, 74B is brought into an abutment against the corresponding pinch-off portion 76A, 76B through its respective opening 77A, 77B. This causes a sealed space to be formed by the surface of the parison P opposed to the cavity 74A, 74B, the pinch-off portion 76A, 76B, and the cavity 74A, 74B.

Figure 16:
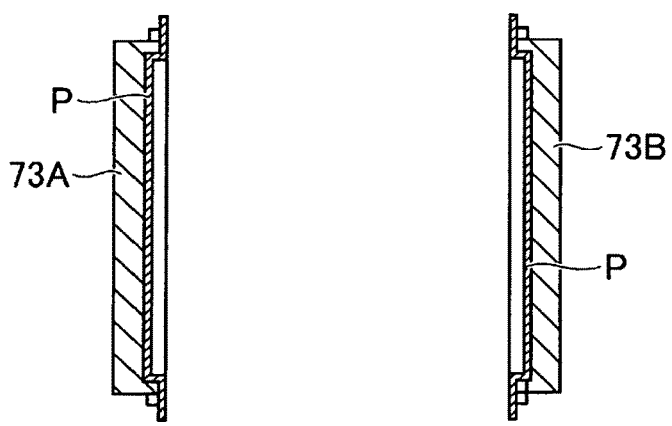
FIG. 16 is a view showing a situation in which the skin sheet is formed in the process of forming the sandwich panel according to the first embodiment of the present invention.

Then, as shown in FIG. 16, air within the sealed space is sucked through each of the pair of split molds 73A, 73B, so that each of the continuous sheet-like parisons P is pressed against the corresponding cavity 74A, 74B and thus, to be formed along the cavity 74A, 74B. In this connection, the continuous sheet-like parison P on the left side in FIG. 16 is not only formed, but also welded to the decoration sheet 14 interposed between the parison P and the corresponding cavity 74A.

Figure 17:
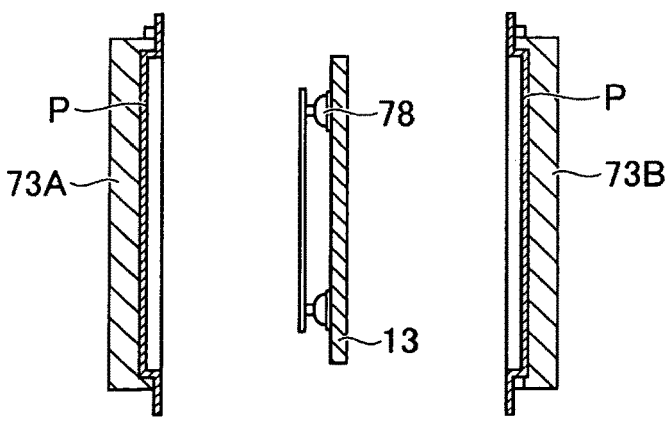
FIG. 17 is a view showing a situation in which a core member sheet is positioned between the pair of split molds in the process of forming the sandwich panel according to the first embodiment of the present invention.

Then, as shown in FIG. 17, the core member 13 held by a suction pad 78 of a manipulator (not shown) is introduced between the pair of split molds 73A, 73B from the side.

Figure 18:
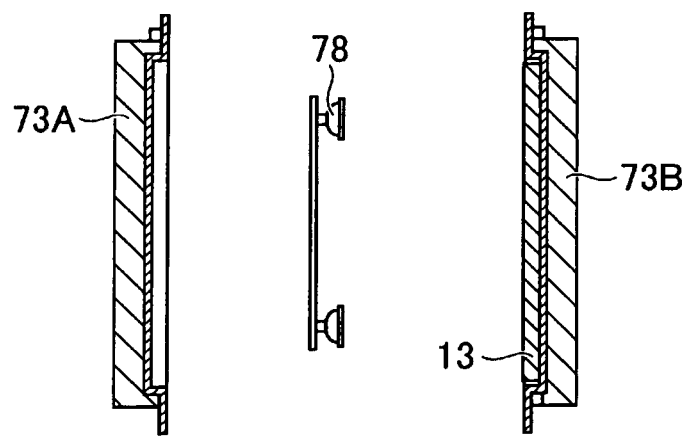
FIG. 18 is a view showing a situation in which the core member sheet is pressed against one of the skin sheets in the process of forming the sandwich panel according to the first embodiment of the present invention.

Then, as shown in FIG. 18, the core member 13 is pressed against the parison P sucked and thus held by the cavity 74B of the split mold 73B on the right side by horizontally moving the manipulator toward the split mold 73B on the right side. This causes the core member 13 to be welded to the parison P. Then, the suction pad 78 is detached from the core member 13, while the manipulator is removed from between the pair of split molds 73A, 73B, which completes the preparation for the closing the molds 73A, 73B.

Figure 19:
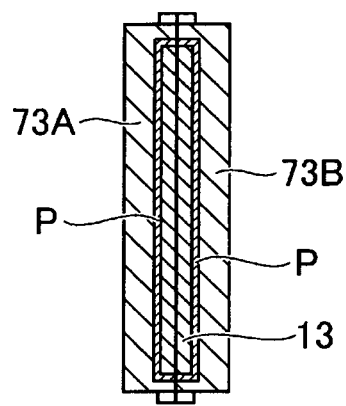
FIG. 19 is a view showing a situation in which the pair of split molds is closed in the process of forming the sandwich panel according to the first embodiment of the present invention.

Then, as shown in FIG. 19, the pair of split molds 73A, 73B are closed and thus clamped by moving the pair of split molds 73A, 73B toward each other from the open position to the closed position. This causes the core member 13 welded to one of the parisons P (the one on the right side in FIG. 19) to be welded to the other of the parisons P, while causing a parting line PL to be formed by the peripheral edges of the parisons P being welded to each other. In this connection, upon the closing of the molds 73A, 73B, since, unlike the skin sheet 12, the core member 13 which has been already formed to become a cold state, is welded to the skin sheet 12 in a molten state, the core member 13 itself is adapted to be so positioned as not to be deformed by the closing.

Figure 20:
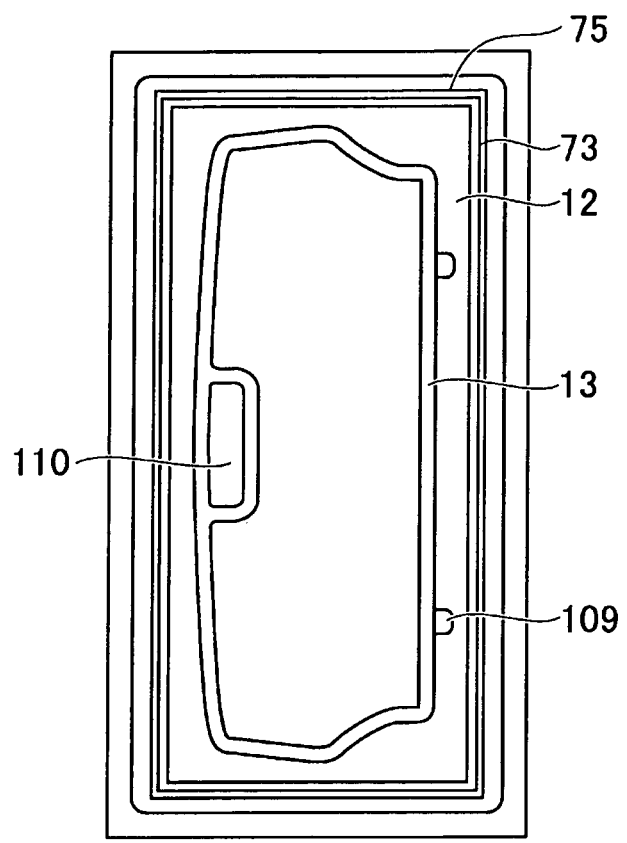
FIG. 20 is a front view showing a cavity of one of the pair of split molds in the apparatus for forming the sandwich panel according to the first embodiment of the present invention.

The above processes completes the sandwich panel 10 in which the decoration sheet 14, the skin sheet 12, the core member 13, and the skin sheet 12 are laminated. FIG. 20 is a front view seen from the cavity 74 of one of the pair of split molds 73 showing the formed skin sheet 12 and the welded core member 13. Reference numbers 109 and 110 indicate a portion of the cavity 74 forming a protrusion and a portion of the cavity 74 forming a grip, respectively. The shape of the core member 13 is a bit smaller than that of the cavity to avoid the portion of the cavity 74 forming a grip.

Figure 21:
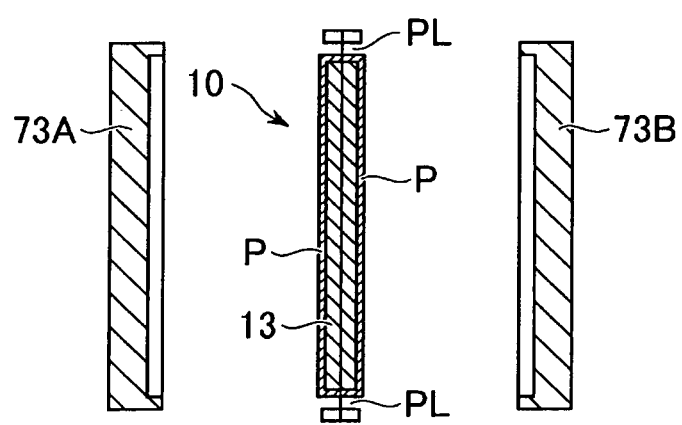
FIG. 21 is a view showing a situation in which the pair of split molds is opened in the process of forming the sandwich panel according to the first embodiment of the present invention.

Then, as shown in FIG. 21, the pair of split molds 73A, 73B are opened, so that each of the cavities 74A, 74B is separated from the completed sandwich panel 10, and then, burrs formed around the parting line PL are removed.

As stated above, the forming of the sandwich panel 10 is completed.

According to the method of forming the sandwich panel 10 including the above construction, skin sheets 12 sandwiching the core member 13 can be formed on the spot by utilizing the thermo plastic sheet-like parison P in a molten state, while the characteristics of the skin sheet 12 in which it is formed along the cavity 52 of the mold can be prevented from being deteriorated due to the reheating of the skin sheet 12 from outside, while at the same time, the adhesive strength of the outer peripheral parting line PL constituting a welding portion of the skin sheets 12, or the adhesive strength between the skin sheet 12 and the core member 13 can be prevented from being deteriorated without causing the waving or the deformation of the skin sheet 12 due to the difference of the thermal shrinkage originated from the difference of the cooling speed between the core member 13 and the skin sheet 12 by utilizing the core member 13 already having been formed, since the thermal capacity of the skin sheet 12 with a comparatively thin thickness is low, and thus the skin sheet 12 is readily cooled.

Such being the case, the sandwich panel 10 with a sufficient strength and any profile or surface shape can be provided without a need to reheat the skin sheet 12.

In a case where a pair of sheet-like parisons P in molten states extruded from an extrusion device which are substantially uniformly heated to be plasticized are used, it is possible to make the strength of the pinch-off portion of the peripheral edge more than 10 kg f/cm, 20 kg f/cm in some cases. In a so-called sheet blow-molding in which a raw material sheet already having been formed is reheated by an infrared heater to be formed again, the strength of the pinch-off portion of the peripheral edge is about 8 kg f/cm, while, in a case where the sheet-like parison P in a molten state extruded from the extrusion device is used, it is between 10 kg f/cm and 35 kg f/cm. This clearly shows that the latter is at a technical advantage over the former. In this connection, the strength of the pinch-off portion is defined to be a welding strength of the parting line formed by two sheets being formed by the pinch-off portion of the mold to be integrally welded to each other. More specifically, a test piece with a width of 25 mm is cut off from a formed product in the direction perpendicular to the parting line, and then, a strength at an ambient temperature (23° C.) is measured by a tensile tester when it reaches a breaking point to be converted into a value per unit cm. The test piece includes a parting line with a width of 25 mm at its substantially central position and its both ends are clamped by a chuck of the tensile tester with a distance between chucked points being 30 mm. The strength is measured at a tensile velocity of 50 mm/min. In a case where the test piece is curved upon cut-off, a portion of the test piece separated from the parting line by more than 20 mm is heated to be deformed in such a way that an angle between both of the ends becomes 180° so that both of the ends can be clamped by the chuck.

As an alternative to the method of forming the sandwich panel 10, the forming may be effected after the pair of split molds 73 are closed. More specifically, the method of forming the sandwich panel 10 may comprise steps of forming a sealed space within the pair of split molds 73 by closing the pair of split molds 73, and pressuring inside the sealed space (the blow molding), or sucking the air within the sealed space through the pair of split molds 73 to form the sheet-like parison P within the sealed space by irregular portions provided on the cavity 74 of each of the pair of split molds 73 while welding the sheet-like parison P and the core member 13, whereby a parting line PL is formed around peripheral edges of the sheet-like parisons P welded to each other with the core member 13 being interposed therebetween.

As a further alternative, with respect to the timing of the positioning of the core member 13 between the pair of split molds 73, as described above, so long as the core member 13 is positioned before the pair of split molds 73 are closed, it may be done either before or after the sheet-like parison for forming the skin sheet is fed between the pair of split molds 73.

A space 82 is provided between the peripheral end portion of the core member 13 and the peripheral end portion 80 of the skin sheets 12 welded to each other by the pinch-off portion 76 by determining a size of the core member 13 or a size of the skin sheet 12 in such a way that the parting line PL formed around the peripheral edges of the two skin sheets 12 welded to each other is separated from the peripheral end portion 80.

This prevents the skin sheet 12 from being stretched in the direction in which the skin sheet 12 are joined to each other along the outer peripheral end face of the core member 13, and thus, resulting in a thin portion or being partially fractured, in the method of manufacturing the sandwich panel in which the core member 13 is sandwiched by the pair of skin sheets 12 and the core member 13 is covered by the pair of skin sheets 12 whose peripheral end faces are welded to each other, so that the precision of the appearance of the sandwich panel can be improved without deteriorating its strength and stiffness.

As shown in FIGS. 32 to 35, as a further alternative, the core member 13 may be reinforced by a reinforcing member 83.

Figure 32:
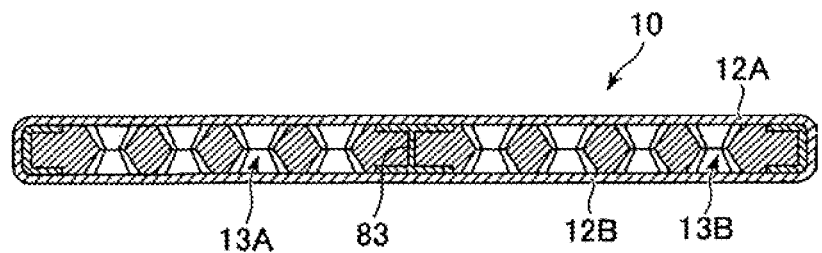
FIG. 32 is a cross sectional view showing the sandwich panel according to another embodiment of the present invention.
Figure 33:
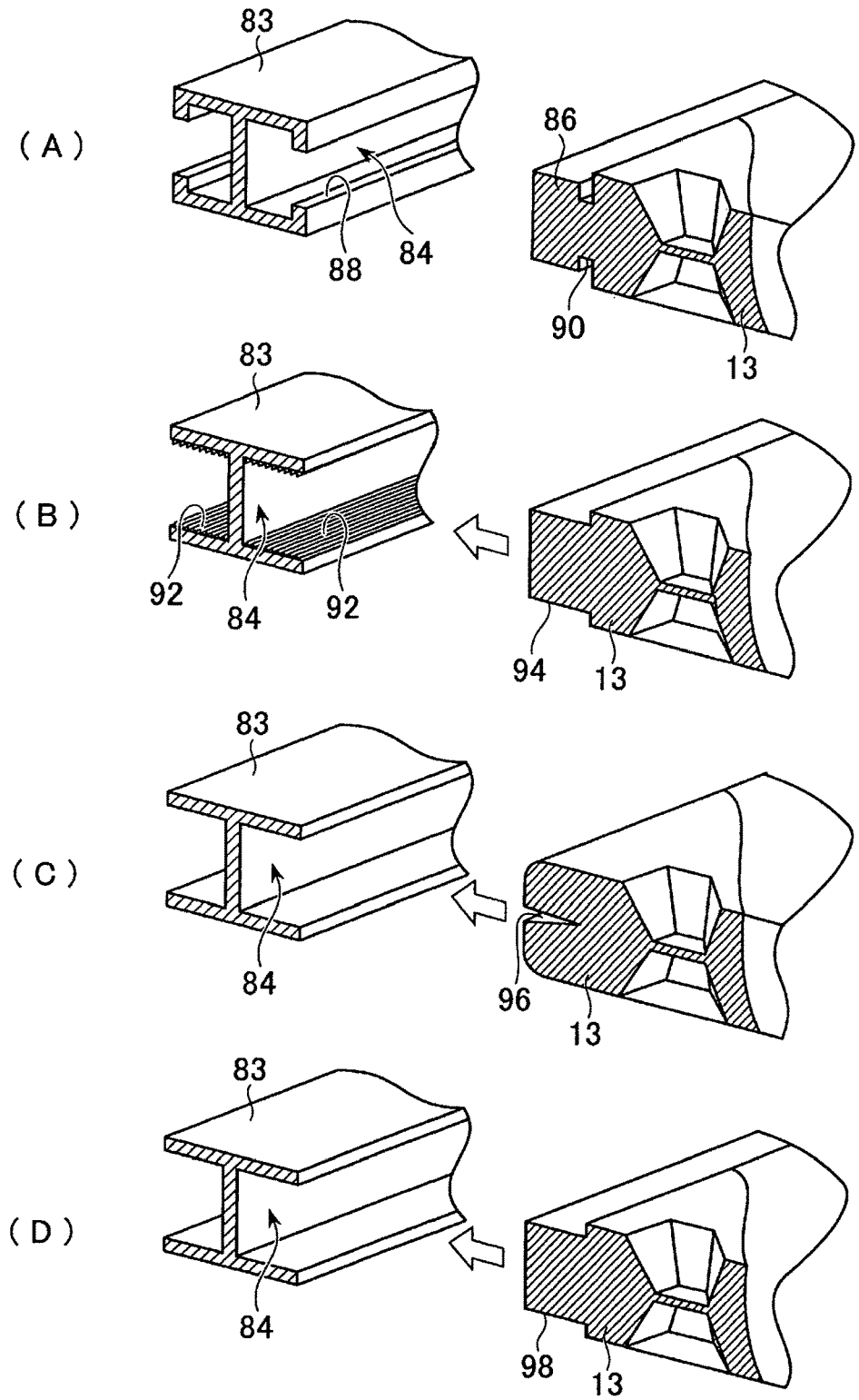
FIG. 33 is a view showing how to assemble the core member of the sandwich panel according to another embodiment of the present invention.

In FIGS. 32 and 33, the core member 13 is a divided type in which it is divided into parts connected by the reinforcing members 83. The reinforcing members 83 includes a concave portion 84 for fitting over an end portion of the divided core member 13, while the end portion of the core member 13 includes a convex portion 86 which is shaped to be complementary to the concave portion 84.

More specifically, the reinforcing member 83 is an elongated member with a length the same as that of the end portion of the core member 13, and includes a groove 84 extending in a longitudinal direction (so-called H-type extrusion reinforce).

A single inner panel is formed by press fitting each of the end portions of the divided core member 13 into the corresponding groove 84 to make the core member 13 integral with the reinforcing member 83. The reinforcing member 83 is made of metal such as aluminum or rigid resin.

In this connection, the reinforcing member 83 may be any member such as a C-shaped member, rectangular pipe, a circular pipe, so long as it can be fitted with the core member 13.

In a case where the reinforcing member 83 is H-type extrusion reinforce, as shown in FIG. 33, the end portion of the core member 13 is press fitted into its groove to become integral with the reinforcing member 83.

As shown in FIG. 33(A), one or both end of the groove 84 of the H-type extrusion reinforce may be formed with a hooked member 88, while the core member 13 may be formed with an engaging groove 90 shaped to be the hooked member 88. The coupling of the core member 13 with the reinforcing member 83 can be firmly held by the fact that the core member 13 can be press fitted into the groove 84.

As shown in FIG. 33(B), the groove 84 of the H-type extrusion reinforce may be formed with many lines of thin grooves (notches) 92 in its longitudinal direction, while the end portion of the core member 13 may be formed with a lower engaging stepped portion 94.

In this connection, as shown in FIG. 33(C), if cut-off 96 is provided on the end portion of the core member 13, the coupling of the core member 13 with the reinforcing member 83 can be firmly held by the fact that the core member 13 can be press fitted into the groove 84 even though the reinforcing member 83 is the normal H-type extrusion reinforcement.

As shown in FIG. 33(D), it is possible to form an inner structure which comprises the core member 13 and H-shaped extrusion reinforcing member 83 on the same surface, by structuring a lower engaging step portion 98 on the end of portion of core member 13.

Figure 34:
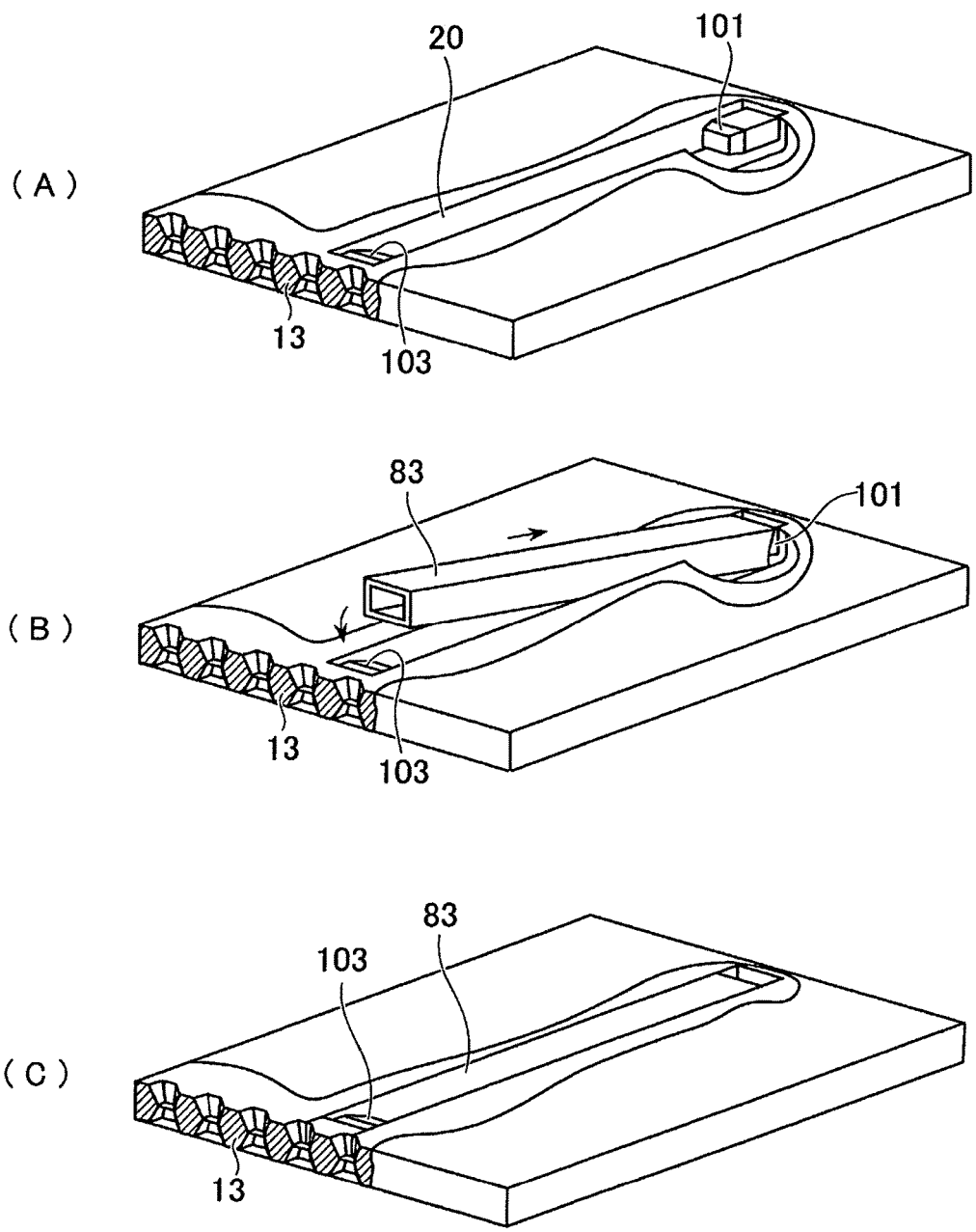
FIG. 34 is a view showing how to assemble the core member of the sandwich panel according to still another embodiment of the present invention.
Figure 35:
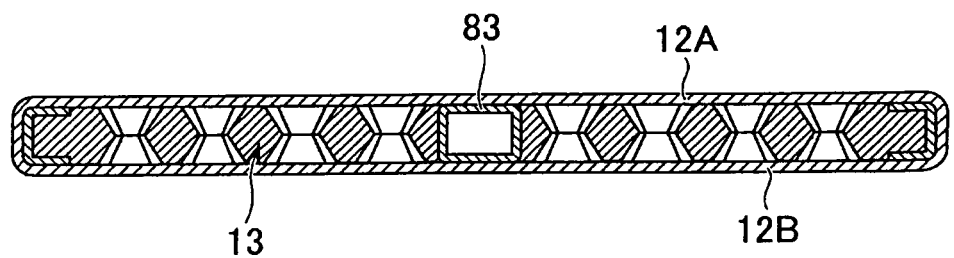
FIG. 35 is a cross sectional view showing the sandwich panel according to still another embodiment of the present invention.

As shown in FIGS. 34 and 35, the plurality of recesses provided on the surface of the thermoplastic resin plate 16 constituting the core member are utilized as a groove or a perforated hole into which a reinforcing member 83 is embedded.

More specifically, as shown in FIG. 34(A), a protrusion 101 for engaging a reinforcing member 83 of the rectangular pipe type is provided on an end of the groove 20 of the core member 13, while a protrusion 103 shorter than the protrusion 101 is provide on the other end thereof.

As shown in FIG. 34(B), one end of the reinforcing member 83 of the rectangular pipe type is engaged by the protrusion 101 to be pushed into the groove 20, while the other end thereof is engaged by the protrusion 103, so that the core member 13 and the reinforcing member 83 of the rectangular pipe type are made integral with each other. In this connection, a structure in which the reinforcing member 83 of the rectangular pipe type is fixed by the fact that the other end of the groove 20 made open in such a way that a locking piece can be fitted thereinto may be adopted.

As described above, in a case where the reinforcing member is assembled into the core member 13, although the end face of the core member 13 has to be shaped in accordance with the reinforcing member, according to the present invention, the core member 13 with the end face of the desired shape can be provided.

As described above, the preferred embodiments of the present invention were described in detail, however, it is evident that those skilled in the art could modify or change the embodiments in various manners without departing from the scope of the present invention.

For instance, in the first embodiment, the core member 13 constituting the sandwich panel 10 consists of the pair of the thermal plastic resin plates 16A, 16B each of which is formed based on the continuous tubular parison P in a molten state, the tubular or the sheet-like discrete parison P in a molten state may be utilized.

In addition, in the above embodiment, each of the pair of thermoplastic resin plates 16A, 16B was formed based on the thermoplastic resin parison P in a molten state using the pair of split molds 50A, 50B by the blow molding or the vacuum forming, it may be formed using the pair of split molds 50A, 50B by the sheet forming (compression forming), so long as the firm adhesion properties between the pair of thermoplastic resin plates 16A, 16B is maintained.

Further, in the first embodiment, the core member 13 consists of the pair of thermoplastic resin plates 16A, 16B each of which includes a plurality of recesses 20A, 20B on the one surface, and each of the plurality of recesses 20A, 20B protrudes at the other surface, so that the abutting planar portion 24 of each of the plurality of recesses 20A, 20B on the one of the pair of thermoplastic resin plates 16A, 16B is welded to the corresponding abutting planar portion 24 of each of the plurality of recesses 20A, 20B on the other of the pair of thermoplastic resin plates 16A, 16B, the plurality of recesses 20A, 20B on the one of the pair of thermoplastic resin plates 16A, 16B does not have to abut against those on the other of the pair of thermoplastic resin plates 16A, 16B, so long as the firm adhesion properties between the pair of thermoplastic resin plates 16A, 16B is maintained.

Still further, in the above embodiment, each of the pair of thermoplastic resin plates 16A, 16B includes the plurality of recesses 20A, 20B on the one surface, each of the plurality of recesses 20A, 20B does not have to protrude at the other surface so that the abutting planar portions 24 on one of the pair of thermoplastic resin plates 16A, 16B are not welded to those on the other thereof.

Still further, in the sandwich panel 10 used for the cargo floor board of the first embodiment, the decoration sheet 14 is attached to the skin sheet 12 on the face side exhibiting an external appearance, the decoration sheet 14 may be omitted, so that the skin sheet 12 on the face side may be exhibited outside.

Still further, the sandwich panel 10 may be used for inner panel for an automobile such as a foot rest, a side door trim, a seat back, a rear parcel shelf, a door panel, a cushion seat, etc., a carrying case for a machine or a tool, a part of a weak current electrical appliance, a building inner panel such as a wall member, a partition, etc., furniture such as a chair, a tank, a dust, a casing, a housing, a tray, and a container.

The inventor carried out a computer simulation analysis in order to investigate a relationship between the reduction of the weight and the stiffness (the flexural rigidity, in particular) with respect to the sandwich panel including the core member with the plurality of recesses each of which being shaped to be a truncated cone.

The conditions on the analysis are as follows.
(1) The Analysis Method
  (i) Analysis: elastic static analysis using FEM
  (ii) Analysis code: general code "MARC"

Figure 22:
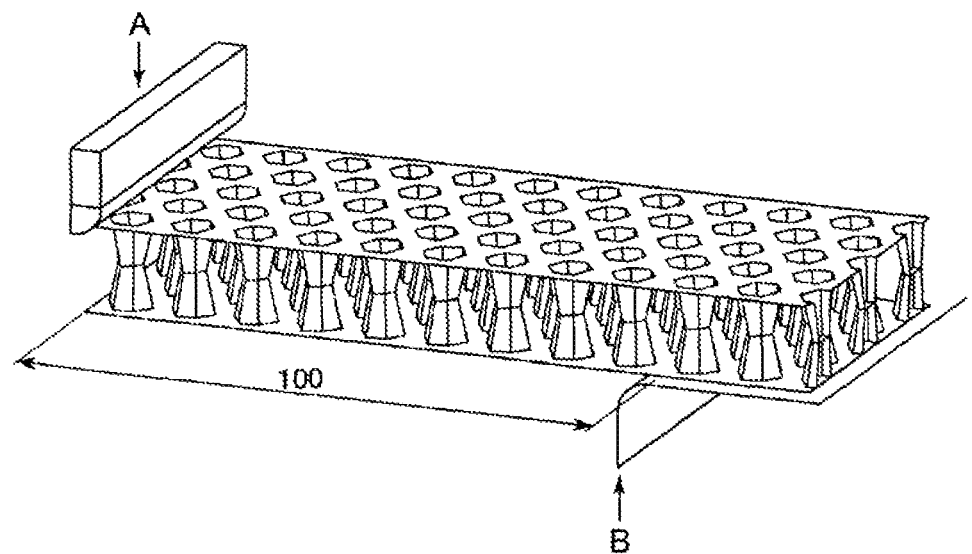
FIG. 22 is a view showing a computer simulation model of the sandwich panel including the core member with a plurality of recesses each of which is shaped to be a truncated cone in the embodiment of the present invention.

(2) The Analysis Model
  (i) Analysis model: three dimensional one-second symmetrical model consisting of a core member and skin sheets each of which is attached to the corresponding surface of the core members (refer to FIG. 22)
  In the model, the core member and the skin sheet are rigidly connected.
  (ii) Dimension: entire surface area: 6000 mm$^2$
    thickness of skin sheet: 1.0 mm
    shape of dent: truncated pyramid with an opening of regular hexagon
  (iii) Physical properties:
    core member: material: foamed polypropylene resin (expansion ratio 2.5)
    skin sheet material: polypropylene and talc 30%
  (iv) Loading and supporting conditions:
  Single-point central concentrated loading with both ends supported
    (In FIG. 22, Supported at B in Case of Load in Direction A)
    In case of only core member: 1 kgf
    In case of core member and skin sheet: 20 kgf
  (v) Items to be evaluated:
    flexural rigidity based on deformation (deflection) and void volume based on recesses
    Void volume=total opening area of recesses/entire surface area (3) The Analysis Parameters
  (i) Thickness of core member: 0.396 mm, 0.447 mm, 0.495 mm, 0.536 mm, 0.550 mm and 0.648 mm
  (ii) Tapering angle of recess: 75°, 80° and 85°
  (iii) Opening of recess: 7 mm and 10 mm
  (iv) Distance between recesses: 1.33 mm, 3 mm and 6 mm
  In the analysis set A, the tapering angle α and the opening of the recess and the distance between the adjacent recesses are selected as parameters under the condition that the weight of the core member is constant, while, in the analysis set B, the tapering angle α and the opening of the recess and the distance between the adjacent recesses are selected as parameters under the condition that the thickness of the core member is constant. In each of the sets A and B, the analysis is carried out for each of cases which is determined based on the tapering angle α and the opening of the recess and the distance between the adjacent recesses. In each case, there are two situations, one being that only the core member is provided, and the other being that the skin sheet is attached on each of the surfaces of the core member.

The analysis result is shown in a table 1.

TABLE 1

Figure 23:
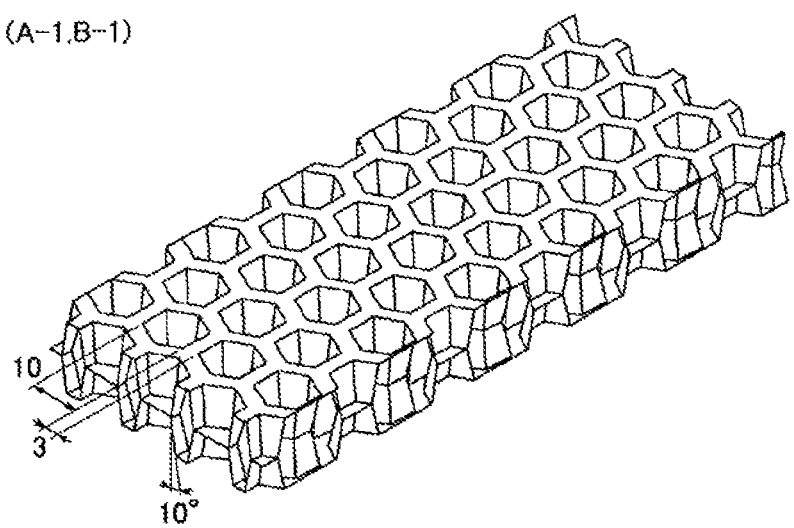
FIG. 23 is a view showing a computer simulation model of the sandwich panel including the core member with a plurality of recesses each of which is shaped to be a truncated cone in case 1 of analysis sets A and B.
Figure 24:
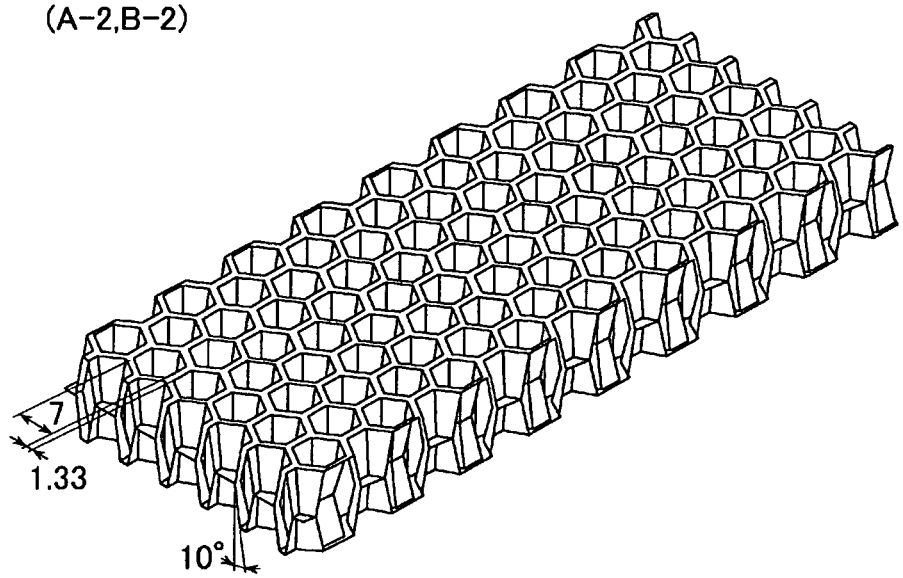
FIG. 24 is a view showing a computer simulation model of the sandwich panel including the core member with a plurality of recesses each of which is shaped to be a truncated cone in case 2 of analysis sets A and B.
Figure 25:
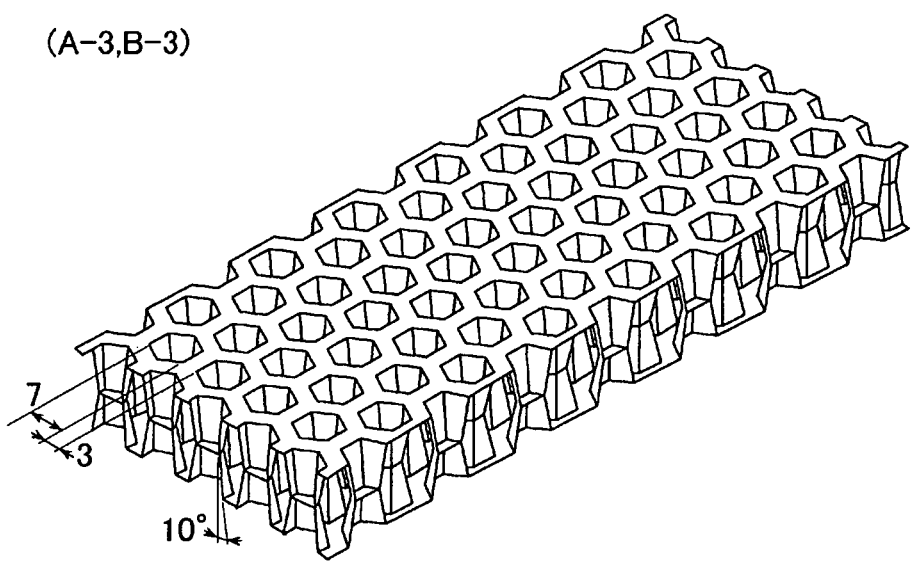
FIG. 25 is a view showing a computer simulation model of the sandwich panel including the core member with a plurality of recesses each of which is shaped to be a truncated cone in case 3 of analysis sets A and B.
Figure 26:
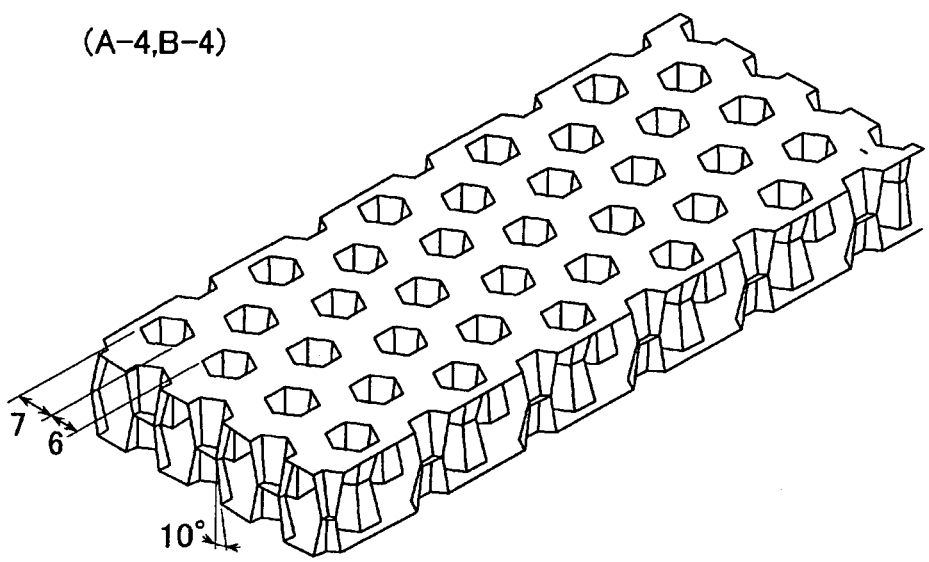
FIG. 26 is a view showing a computer simulation model of the sandwich panel including the core member with a plurality of recesses each of which is shaped to be a truncated cone in case 4 of analysis sets A and B.
Figure 27:
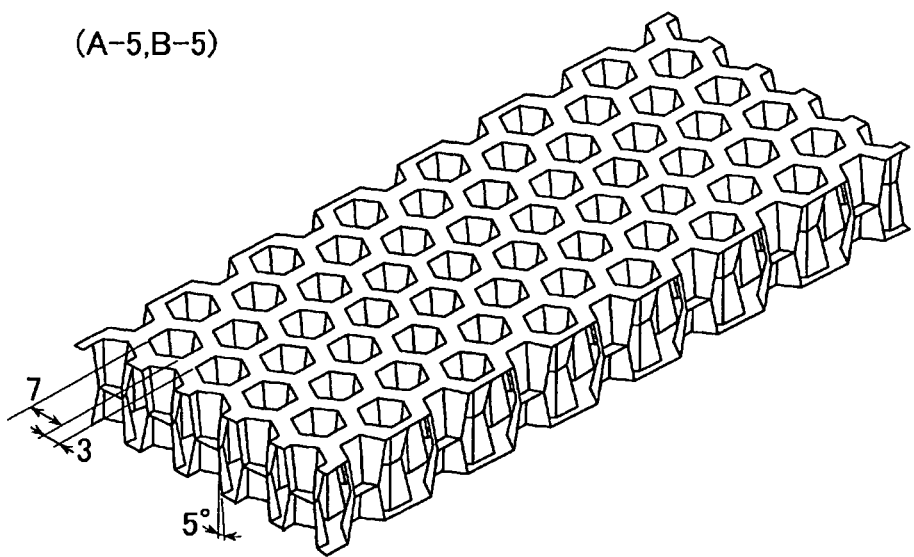
FIG. 27 is a view showing a computer simulation model of the sandwich panel including the core member with a plurality of recesses each of which is shaped to be a truncated cone in case 5 of analysis sets A and B.
Figure 28:
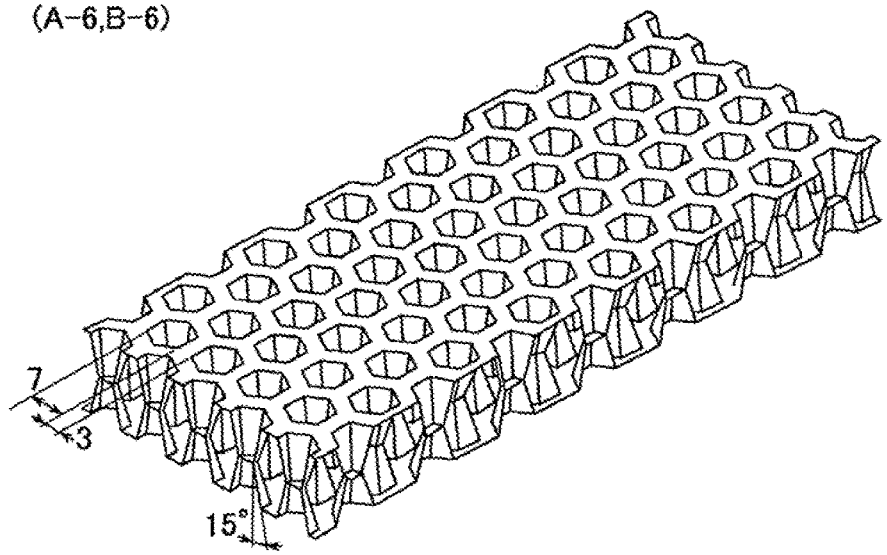
FIG. 28 is a view showing a computer simulation model of the sandwich panel including the core member with a plurality of recesses each of which is shaped to be a truncated cone in case 6 of analysis sets A and B.

| | | Analysis Condition | | | | | Analysis Result | | |
|---|---|---|---|---|---|---|---|---|---|
| Analysis Set | Analysis Case | Size of Recess (mm) | Distance between Recesses (mm) | Tapering Angle α(°) | Thickness of Core Member (mm) | Related FIG. | Deformation (mm) | Deformation (mm) | Void Volume |
| A | 1 | 10 | 3 | 80 | 0.5 | FIG. 23 | 12.34 | 4.534 | 0.590 |
|   | 2 | 7 | 1.33 | 80 | 0.5 | FIG. 24 | 21.94 | 4.656 | 0.703 |
|   | 3 | 7 | 3 | 80 | 0.5 | FIG. 25 | 9.159 | 4.972 | 0.488 |
|   | 4 | 7 | 6 | 80 | 0.5 | FIG. 26 | 5.952 | 5.682 | 0.283 |
|   | 5 | 7 | 3 | 85 | 0.5 | FIG. 27 | 10.66 | 5.101 | 0.488 |
|   | 6 | 7 | 3 | 75 | 0.5 | FIG. 28 | 7.799 | 5.005 | 0.488 |
| B | 1 | 10 | 3 | 80 | 0.536 | FIG. 23 | 13.55 | 4.691 | 0.590 |
|   | 2 | 7 | 1.33 | 80 | 0.396 | FIG. 24 | 15.61 | 4.177 | 0.703 |
|   | 3 | 7 | 3 | 80 | 0.495 | FIG. 25 | 9.031 | 4.946 | 0.488 |
|   | 4 | 7 | 6 | 80 | 0.648 | FIG. 26 | 9.996 | 6.558 | 0.283 |

TABLE 1-continued

| Analysis Set | Analysis Case | Size of Recess (mm) | Distance between Recesses (mm) | Tapering Angle α(°) | Thickness of Core Member (mm) | Related FIG. | Deformation (mm) | Deformation (mm) | Void Volume |
|---|---|---|---|---|---|---|---|---|---|
| | 5 | 7 | 3 | 85 | 0.447 | FIG. 27 | 9.123 | 4.814 | 0.488 |
| | 6 | 7 | 3 | 75 | 0.550 | FIG. 28 | 8.920 | 5.267 | 0.488 |

Figure 29:
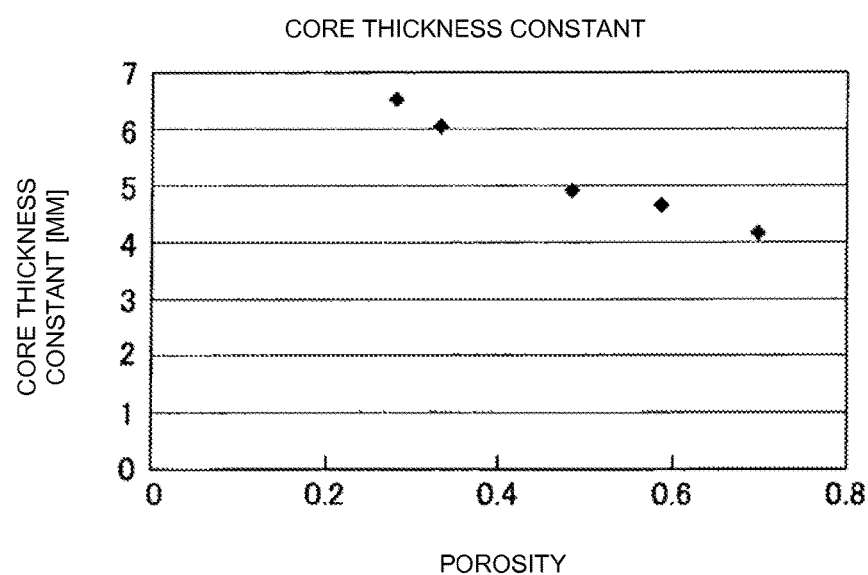
FIG. 29 is a graph showing a relationship between the void volume and the amount of the deformation under the condition that the thickness of the core member is constant in a analysis result of the sandwich panel including the core member with a plurality of recesses each of which is shaped to be a truncated cone in the embodiment of the present invention.
Figure 30:
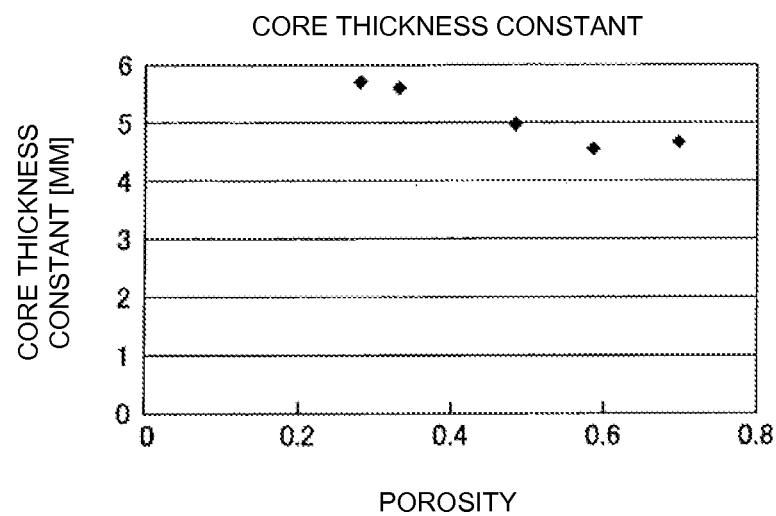
FIG. 30 is a graph showing a relationship between the void volume and the amount of the deformation under the condition that the weight of the core member is constant in a analysis result of the sandwich panel including the core member with a plurality of recesses each of which is shaped to be a truncated cone in the embodiment of the present invention.
Figure 31:
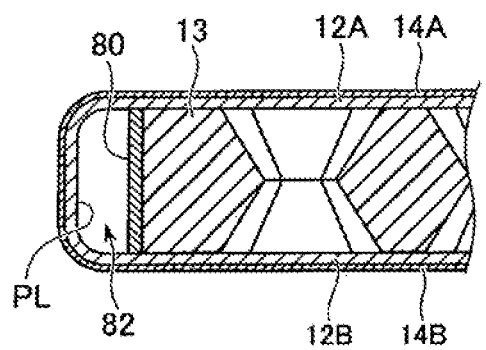
FIG. 31 is a partial detailed view showing a portion around an end of the sandwich panel according to another embodiment of the present invention.

(4) The Analysis Result
  (i) Comparing each of the case in the analysis set A (the thickness of the core member is constant) with the corresponding case in the analysis set B (the weight of the core member is constant), it is found out that the thicker the thickness of the core member becomes, the more the flexural rigidity of the entire sandwich panel becomes.
  (ii) In each of the analysis sets A and B, when the case 1 is compared with the case 3 in which the distance between the recesses and the tapering angle α are the same as those in the case 1 and the size of the dent is only different from that in the case 1, it is found out that the bigger the size of the recess becomes, the more the flexural rigidity of the entire sandwich panel decreases in case of only the core member, but the more the flexural rigidity of the entire sandwich panel increases in case of the core member with the skin sheets.
  (iii) In each of the analysis sets A and B, when the case 2 is compared with the case 4 in which the size of the recess and the tapering angle α are the same as those in the case 4 and the distance between the recesses is only different from that in the case 4, it is found out that the bigger the distance between the recesses becomes, the more the flexural rigidity of the entire sandwich panel increases in case of only the core member, but the more the flexural rigidity of the entire sandwich panel decreases in case of the core member with the skin sheets.
  (iv) In each of the analysis sets A and B, when the cases 3, 5 and 6 (in these cases, the size of the recess and the distance between the recesses are common, and only the tapering angle α differs from each other) are compared with each other, it is found out that the bigger the tapering angle α becomes, the more the flexural rigidity of the entire sandwich panel increases in case of only the core member, but the more the flexural rigidity of the entire sandwich panel decreases in case of the core member with the skin sheets.
  (v) As to the analysis set A, FIG. 29 shows a relationship between the void volume and the amount of the deformation in the cases 1 to 4 where the tapering angle α is common in case of the core member with skin sheets. As shown in FIG. 29, the bigger the void volume become under the condition that the thickness of the core member is constant, the less the amount of the deformation becomes, so that the flexural rigidity becomes big.
  (vi) As to the analysis set B, FIG. 30 shows a relationship between the void volume and the amount of the deformation in the cases 1 to 4 where the tapering angle α is common in case of the core member with skin sheets. As shown in FIG. 30, the bigger the void volume become under the condition that the weight of the core member is constant, the less the amount of the deformation becomes, so that the flexural rigidity becomes big.

Based on the above analysis result, it is concluded that in order to obtain the effect of the provision of the skin sheet on the flexural rigidity of the entire sandwich panel under the condition that the area of the sheet is constant and that the firm adhesion properties between the core member and the skin sheet are maintained, it is advantageous to increase the void volume by making the opening of the recess big and densely arrange the recesses on the surface of the core member, even though the flexural rigidity of the core member itself is decreased, and making the tapering angle of the recess big, preferably 90°.

The invention claimed is:
1. A method of forming a sandwich panel including a core member made of a foamed thermo plastic interposed between two resin skin sheets, the rigidity of each of which is set to be higher than that of the core member, comprising the steps of:
  positioning a molten tubular core parison made of thermo plastic between opposed cavities of a first pair of split molds in such a way that molten tubular core parison protrudes around the cavities of the first pair of split molds, wherein the cavity of each of the first pair of split molds has a portion on which a plurality of protrusions provided in an independent and dispersed configuration and a portion on which no protrusions are provided, and wherein the protrusions have a truncated conical form in a thicknesswise direction,
  closing the first pair of split molds to form a sealed space inside the first pair of split molds,
  forming the molten tubular core parison in the sealed space inside the first pair of split molds into a core member, by the steps of:
    pressurizing inside the molten tubular core parison in the sealed space inside the first pair of split molds, or sucking the molten tubular core parison through the first pair of closed split molds, to press opposite surfaces of the molten tubular core parison against the plurality of protrusions provided on the corresponding cavity of the first pair of split molds and form a plurality of recesses on the surface thereof, each of the recesses inwardly tapering in a converging manner to form an abutting portion at its most convergent portion and the recesses corresponding to the protrusions, to weld the abutting portion of each of the plurality of recesses of one of the surfaces of the molten tubular core parison and that of the corresponding recess of the other of the surfaces of the molten tubular core parison, the plurality of recesses being formed in an independent and dispersed configuration, with each of the plurality of recesses protruding inwardly in a truncated conical form in a thicknesswise direction of the tubular core parison from an opening in the surface of the tubular core parison toward an opposite surface thereof, providing a groove on the surface of the core member, and embedding a reinforcing member into the groove, wherein the reinforcing member is a pipe, wherein the core member includes, in the groove, first and second protrusions protruding from longitudinal ends of the groove, respectively, the second protrusion is shorter than the first protrusion, the one end of the pipe is first engaged with the first protrusion while the pipe is tilted, and thereafter another end of the pipe is engaged with the second protrusion by pushing the pipe into the groove, and the one end of the pipe does not contact the longitudinal end of the groove, positioning the core member and the reinforcing member between the cavities of a second pair of split molds, the reinforcing member being embedded in the groove of the core member, positioning two sheet-like skin parisons made of thermo plastic in molten states between the opposed cavities of a second pair of split molds so as to protrude around the cavities of the second pair of split molds, moving the core member and the reinforcing member in a horizontal direction toward one of the second pair of split molds to press it against one of the two sheet-like skin parisons and weld the core member to the one of the two sheet-like skin parisons, closing the second pair of split molds to form a sealed space inside the second pair of split molds with the core member being kept welded to the one of the two sheet-like skin parisons, and forming the sheet-like skin parisons in the sealed space inside the second pair of split molds by means of irregularities provided on the cavity of each of the second pair of split molds by pressurizing inside the sealed space inside the second pair of split molds or sucking the sealed space through the second pair of closed split molds to weld the sheet-like skin parisons and the welding surfaces of the core member, whereby to create a sandwich panel in which the core member and the reinforcing member are interposed between two resin skin sheets formed by the sheet-like skin parisons, with a parting line being formed around peripheral edges of the welded sheet-like parisons with the core member and the reinforcing member being arranged inside two resin skin sheets, wherein the tapering angle of each of the plurality of recesses is determined based on a relationship among the distance between the two resin skin sheets, a total adhesive area between each of the two resin skin sheets and the corresponding surface of the core member, and a total abutting area at which abutting surfaces of the core member are abutted against each other to obtain a required flexural rigidity for the sandwich panel.

2. The method of forming the sandwich panel according to claim 1, wherein:

the tapering angle of each of the plurality of recesses is determined based on a relationship among the distance between the two resin skin sheets, a total adhesive area between each of the two resin skin sheets and the corresponding surface of the core member, and a total abutting area at which the abutting portions of the plurality of recesses on one of the surfaces of the core parison abutted against those of the plurality of recesses on the other of the surfaces of the core parison to obtain a required flexural rigidity for the sandwich panel.

3. The method of forming the sandwich panel according to claim 1, wherein:

the reinforcing member is a rectangular pipe having first and second ends, and the groove has first and second ends and comprises on the first end thereof a first protrusion for engaging the reinforcing member and on the second end thereof a second protrusion, and the step of embedding the reinforcing member into the groove further comprises a step of engaging the first end of the reinforcing member with the first protrusion, while engaging the second end of the reinforcing member with the second protrusion in such a way that the core member and the reinforcing member are made integral with each other.

4. A method of forming a sandwich panel including a core member made of a foamed thermo plastic interposed between two resin skin sheets, the rigidity of each of which is set to be higher than that of the core member, comprising the steps of:

positioning a molten tubular core parison made of thermo plastic between opposed cavities of a first pair of split molds in such a way that the molten tubular core parison protrudes around the cavities of the first pair of split molds, wherein the cavity of each of the first pair of split molds has a portion on which a plurality of protrusions are provided in an independent and dispersed configuration and a portion on which no protrusions are provided, and wherein the protrusions have a truncated conical form in a thicknesswise direction, closing the first pair of split molds to form a sealed space inside the first pair of split molds, forming the molten tubular core parison in the sealed space inside the first pair of split molds into a core member, by the steps of:

pressurizing inside the molten tubular core parison in the sealed space inside the first pair of split molds, or sucking the molten tubular core parison through the first pair of closed split molds, to press opposite surfaces of molten tubular core parison against the plurality of protrusions provided on the corresponding cavity of the first pair of split molds and form a plurality of recesses thereon, each of the recesses inwardly tapering in a converging manner to form an abutting portion at its most convergent portion, to weld the abutting portion of each of the plurality of recesses of one of the surfaces of the molten tubular core parison and that of the corresponding recess of the other of the surfaces of the molten tubular core parison, the plurality of recesses being formed in an independent and dispersed configuration, with each of the plurality of recesses protruding inwardly in a truncated conical form in a thicknesswise direction of the core parison from an opening in the surface of the core parison toward an opposite surface thereof, providing a groove on the surface of the core member, and embedding a reinforcing member into the groove, wherein the reinforcing member is a pipe, wherein the core member includes, in the groove, first and second protrusions protruding from longitudinal ends of the groove, respectively, the second protrusion is shorter than the first protrusion, the one end of the pipe is first engaged with the first protrusion while the pipe is tilted, and thereafter another end of the pipe is engaged with the second protrusion by pushing the pipe into the groove, and the one end of the pipe does not contact the longitudinal end of the groove, positioning two sheet-like skin parisons made of thermo plastic in molten states between the opposed cavities of a second pair of split molds so as to protrude around the cavities of the second pair of split molds, forming a sealed space between the cavity of each of the second pair of split molds and the corresponding sheet-like skin parison, forming each of the sheet-like skin parisons by sucking it through the corresponding sealed space inside the second pair of split molds so as to press it against the corresponding cavity of the second pair of split molds, disposing the core member and the reinforcing member between the second pair of split molds, the reinforcing member being embedded in the groove of the core member, moving the core member and the reinforcing member in a horizontal direction toward one of the second pair of split molds to press it against one of the two sheet-like skin parisons and weld the core member to the one of the two sheet-like skin parisons, and closing the second pair of split molds with the core member being kept welded to the one of the two sheet-like skin parisons to weld the two sheet-like skin parisons and the welding surfaces of the core member, whereby and to form a parting line around peripheral edges of the welded sheet-like skin parisons with the core member and the reinforcing member being arranged inside, wherein the tapering angle of each of the plurality of recesses is determined based on a relationship among the distance between the two resin skin sheets, a total adhesive area between each of the two resin skin sheets and the corresponding surface of the core member, and a total abutting area at which abutting surfaces of the core member are abutted against each other to obtain a required flexural rigidity for the sandwich panel.

5. The method of forming the sandwich panel according to claim 4, wherein a size of the core member, or a size of the skin sheet is determined in such a way that the parting line formed around peripheral edges of the two welded skin sheets is separated from the peripheral edge of the core member.

6. The method of forming the sandwich panel according to claim 4, wherein:
the tapering angle of each of the plurality of recesses is determined based on a relationship among the distance between the two resin skin sheets, a total adhesive area between each of the two resin skin sheets and the corresponding surface of the core member, and a total abutting area at which the abutting portions of the plurality of recesses on one of the surfaces of the core parison abutted against those of the plurality of recesses on the other of the surfaces of the core parison to obtain a required flexural rigidity for the sandwich panel.

7. The method of forming the sandwich panel according to claim 4, wherein:
the reinforcing member is a rectangular pipe having first and second ends, and the groove has first and second ends and comprises on the first end thereof a first protrusion for engaging the reinforcing member and on the second end thereof a second protrusion, and
the step of embedding the reinforcing member into the groove further comprises a step of engaging the first end of the reinforcing member with the first protrusion, while engaging the second end of the reinforcing member with the second protrusion in such a way that the core member and the reinforcing member are made integral with each other.

8. A method of forming a sandwich panel including a core member made of a foamed thermo plastic interposed between two resin skin sheets, comprising the steps of:
positioning a molten tubular core parison made of thermo plastic between opposed cavities of a first pair of split molds in such a way that molten tubular core parison protrudes around the cavities of the first pair of split molds, closing the first pair of split molds to form a sealed space inside the first pair of split molds, forming the molten tubular core parison in the sealed space inside the first pair of split molds into a core member, by the steps of:
pressurizing inside the molten tubular core parison in the sealed space inside the first pair of split molds, or sucking the molten tubular core parison through the first pair of closed split molds, to press opposite surfaces of the molten tubular core parison against the plurality of protrusions provided on the corresponding cavity of the first pair of split molds and form a plurality of recesses on the surface thereof, to weld the abutting portion of each of the plurality of recesses of one of the surfaces of the molten tubular core parison and that of the corresponding recess of the other of the surfaces of the molten tubular core parison, providing a groove on the surface of the core member, and embedding a reinforcing member into the groove, wherein the reinforcing member is a pipe, wherein the core member includes, in the groove, first and second protrusions protruding from longitudinal ends of the groove, respectively, the second protrusion is shorter than the first protrusion, the one end of the pipe is first engaged with the first protrusion while the pipe is tilted, and thereafter another end of the pipe is engaged with the second protrusion by pushing the pipe into the groove, and the one end of the pipe does not contact the longitudinal end of the groove, positioning two sheet-like skin parisons made of thermo plastic in molten states between the opposed cavities of a second pair of split molds so as to protrude around the cavities of the second pair of split molds with the core member and the reinforcing member sandwiched between said two sheet-like skin parisons, the reinforcing member being embedded in the groove of the core member, closing the second pair of split molds to form a sealed space inside the second pair of split molds with the core member being kept welded to one of the two sheet-like skin parisons, and forming the sheet-like skin parisons in the sealed space inside the second pair of split molds by means of irregularities provided on the cavity of each of the second pair of split molds by pressurizing inside the sealed space inside the second pair of split molds or sucking the sealed space through the second pair of closed split molds to weld the sheet-like skin parisons and the welding surfaces of the core member, whereby to create a sandwich panel in which the core member and the reinforcing member are interposed between two resin skin sheets formed by the sheet-like skin parisons, with a parting line being formed around peripheral edges of the welded sheet-like parisons with the core member and the reinforcing member being arranged inside two resin skin sheets.

9. The method of forming the sandwich panel according to claim 8, wherein:

the reinforcing member is a rectangular pipe having first and second ends, and the groove has first and second ends and comprises on the first end thereof a first protrusion for engaging the reinforcing member and on the second end thereof a second protrusion, and the step of embedding the reinforcing member into the groove further comprises a step of engaging the first end of the reinforcing member with the first protrusion, while engaging the second end of the reinforcing member with the second protrusion in such a way that the core member and the reinforcing member are made integral with each other.

* * * * *